(12) United States Patent
Yang et al.

(10) Patent No.: US 12,222,599 B2
(45) Date of Patent: Feb. 11, 2025

(54) OPTICAL LAYER AND OPTICAL SYSTEM

(71) Applicant: 3M INNOVATIVE PROPERTIES COMPANY, St. Paul, MN (US)

(72) Inventors: Zhaohui Yang, North Oaks, MN (US); Przemyslaw P. Markowicz, Woodbury, MN (US); Mark A. Roehrig, Stillwater, MN (US); Tri D. Pham, Woodbury, MN (US); Serena L. Schleusner, Roberts, WI (US); David A. Rosen, North St. Paul, MN (US); Yang Liu, Mercer Island, WA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 235 days.

(21) Appl. No.: 17/776,941

(22) PCT Filed: Dec. 1, 2020

(86) PCT No.: PCT/IB2020/061327
§ 371 (c)(1),
(2) Date: May 13, 2022

(87) PCT Pub. No.: WO2021/111297
PCT Pub. Date: Jun. 10, 2021

(65) Prior Publication Data
US 2022/0397791 A1    Dec. 15, 2022

Related U.S. Application Data

(60) Provisional application No. 62/944,676, filed on Dec. 6, 2019.

(51) Int. Cl.
*G02F 1/1335*    (2006.01)
*G02B 3/00*    (2006.01)

(52) U.S. Cl.
CPC ..... *G02F 1/133526* (2013.01); *G02B 3/0056* (2013.01); *G02F 1/133507* (2021.01); *G02F 1/133524* (2013.01)

(58) Field of Classification Search
None
See application file for complete search history.

(56) References Cited

U.S. PATENT DOCUMENTS 5,175,030 A    12/1992    Lu et al.
5,183,597 A    2/1993    Lu
(Continued)

FOREIGN PATENT DOCUMENTS

CN    111435213 A    12/2021
JP    2003046874 A    2/2003
(Continued)

OTHER PUBLICATIONS

International Search Report for PCT International Application No. PCT/IB2020/061327, mailed on Mar. 2, 2021, 4 pages.

*Primary Examiner* — Phu Vu
(74) *Attorney, Agent, or Firm* — Clifton F. Richardson

(57) ABSTRACT

An optical system includes a lens layer including a plurality of microlenses arranged along orthogonal first and second directions, and at least one optically opaque mask layer spaced apart from the lens layer and defining a plurality of through openings therein arranged along the first and second directions. There is a one-to-one correspondence between the microlenses and the openings, such that for each microlens, the microlens and corresponding openings are substantially centered on a straight line making a same oblique angle with the lens layer. An optical layer can include the lens layer and the optically opaque mask layer embedded in the optical layer.

17 Claims, 24 Drawing Sheets

(56) References Cited

U.S. PATENT DOCUMENTS

| | | |
|---|---|---|
| 8,202,573 B2 | 6/2012 | Pokorny et al. |
| 9,575,233 B2 | 2/2017 | Merrill et al. |
| 9,919,339 B2 | 3/2018 | Johnson et al. |
| 10,303,921 B1 | 5/2019 | He et al. |
| 2001/0039061 A1 | 11/2001 | Suzuki et al. |
| 2001/0051405 A1 | 12/2001 | Sekine |
| 2006/0109549 A1 | 5/2006 | Shimizu |
| 2007/0002452 A1 | 1/2007 | Munro |
| 2007/0258149 A1 | 11/2007 | Gardner et al. |
| 2009/0097229 A1 | 4/2009 | Wood et al. |
| 2009/0179142 A1* | 7/2009 | Duparre ............ H01L 27/14605 438/69 |
| 2012/0064296 A1 | 3/2012 | Walker, Jr. et al. |
| 2013/0011608 A1 | 1/2013 | Wolk et al. |
| 2013/0235614 A1 | 9/2013 | Wolk et al. |
| 2018/0005005 A1 | 1/2018 | He et al. |
| 2018/0012069 A1 | 1/2018 | Chung et al. |
| 2018/0059475 A1 | 3/2018 | Lee et al. |
| 2019/0369299 A1 | 12/2019 | Yamamoto et al. |
| 2020/0293738 A1 | 9/2020 | Zhang |
| 2021/0249457 A1 | 8/2021 | Baba |

FOREIGN PATENT DOCUMENTS

| | | |
|---|---|---|
| JP | 2005148440 A | 6/2005 |
| JP | 2008003243 A | 1/2008 |
| JP | 2008168118 A | 7/2008 |
| JP | 2010093124 A | 4/2010 |
| JP | 2010098055 A | 4/2010 |
| JP | 2010237565 A | 10/2010 |
| JP | 2011502273 A | 1/2011 |
| JP | 2012151367 A | 8/2012 |
| JP | 2014032229 A | 2/2014 |
| JP | 2018120197 A | 8/2018 |
| JP | 2019220941 A | 12/2019 |
| WO | 2013111499 A1 | 8/2013 |
| WO | 2016098283 A1 | 6/2016 |
| WO | 2019135190 A1 | 7/2019 |
| WO | 2020035768 A1 | 2/2020 |

* cited by examiner

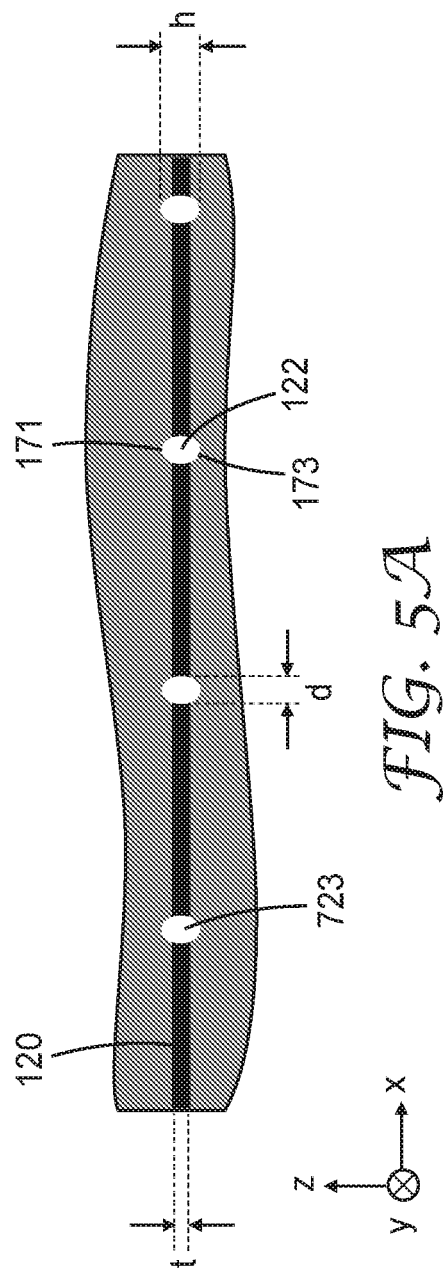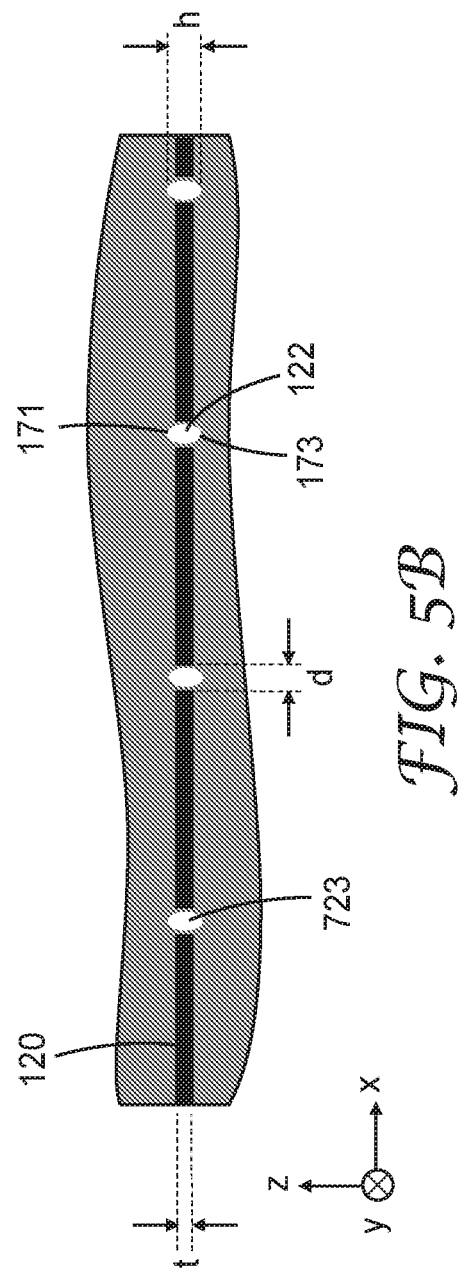

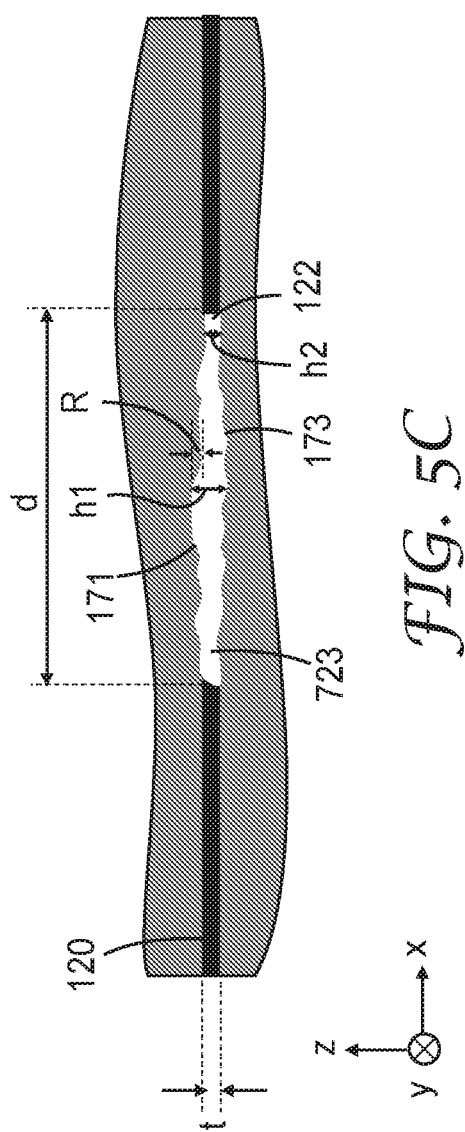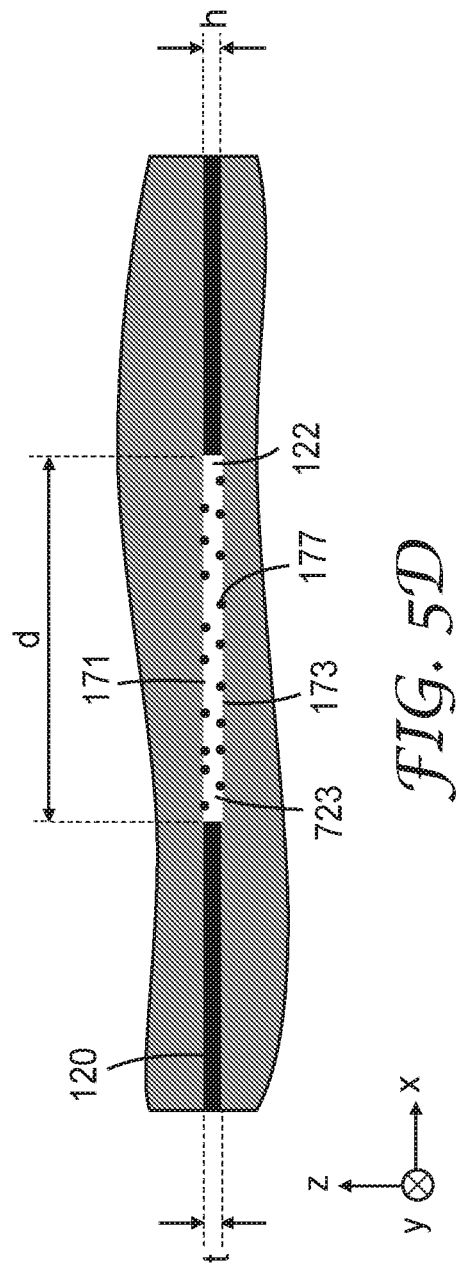

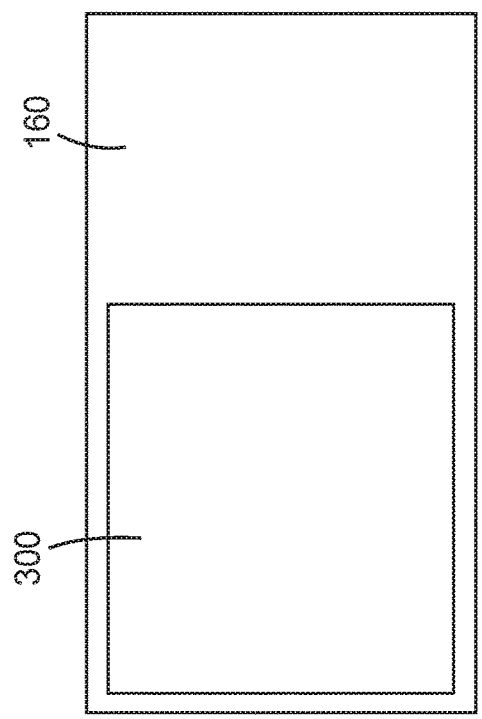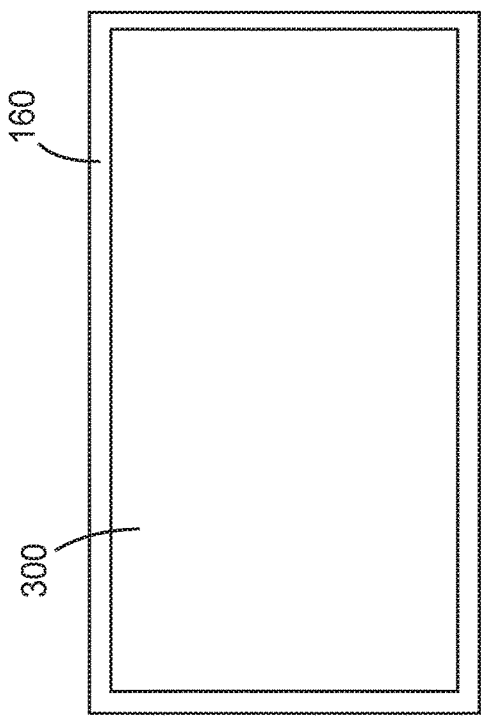

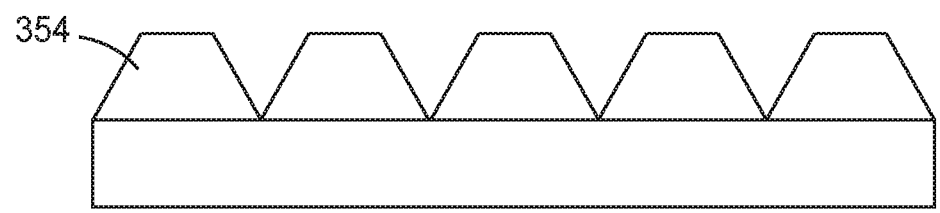
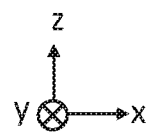
FIG. 11
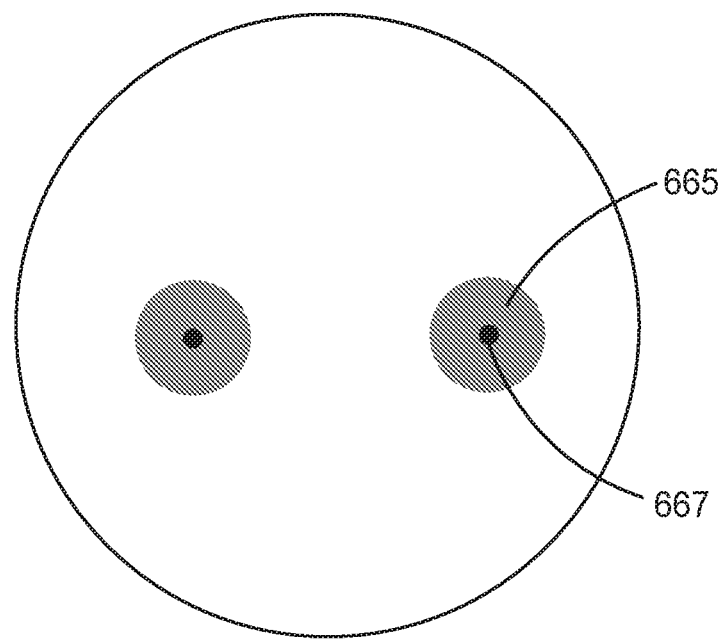
FIG. 12A

OPTICAL LAYER AND OPTICAL SYSTEM

CROSS REFERENCE TO RELATED APPLICATIONS

This application is a national stage filing under 35 U.S.C. 371 of PCT/IB2020/061327, filed Dec. 1, 2020, which claims the benefit of Provisional Application No. 62/944,676, filed Dec. 6, 2019, the disclosures of which are incorporated by reference in their entirety herein.

BACKGROUND

A device including a liquid crystal display can include a fingerprint sensor behind the display.

SUMMARY

In some aspects, the present disclosure provides an optical system including a lens layer including a plurality of microlenses arranged along orthogonal first and second directions, and at least one optically opaque mask layer spaced apart from the lens layer and defining a plurality of through openings therein arranged along the first and second directions. There can be a one-to-one correspondence between the microlenses and the openings, such that for each microlens, the microlens and corresponding openings are substantially centered on a straight line making a same oblique angle with the lens layer. An optical layer can include the lens layer and the optically opaque mask layer embedded in the optical layer.

In some aspects, the present disclosure provides an optical system including: a lens layer including a plurality of microlenses arranged along orthogonal first and second directions; an optically opaque first mask layer spaced apart from the lens layer and defining a plurality of through first openings therein arranged along the first and second directions; and an optically opaque second mask layer spaced apart from the lens and first mask layers and defining a plurality of through second openings therein arranged along the first and second directions. The first mask layer is disposed between the lens layer and the second mask layer. There is a one-to-one correspondence between the microlenses and the first and second openings, such that for each microlens, the microlens and corresponding first and second openings are substantially centered on a straight line making a same oblique angle with the lens layer. When an image light carrying an image is incident on the microlens along the straight line with the image light substantially filling the microlens, greater than about 35%, or greater than about 40%, or greater than about 45%, or greater than about 50% of the incident image light is transmitted by the second opening. At least one of the first and second openings is sized so as to reduce an image quality degradation due to the microlens.

In some aspects, the present disclosure provides an optical layer including: a structured first major surface and an opposite second major surface, the structured first major surface including a plurality of microlenses arranged along orthogonal first and second directions; and an embedded optically opaque first mask layer disposed between and spaced apart from the first and second major surfaces. The first mask layer defines a plurality of through first openings therein arranged along the first and second directions. There can be a one-to-one correspondence between the microlenses and the first openings. For each first opening in at least a majority of the first openings, the first opening defines a voided region having a maximum thickness greater than an average thickness of the first mask layer.

In some aspects, the present disclosure provides an optical layer including: a structured first major surface and an opposite second major surface, the structured first major surface including a plurality of microlenses arranged along orthogonal first and second directions; and an embedded optically opaque first mask layer disposed between and spaced apart from the first and second major surfaces. The first mask layer defines a plurality of through first openings therein arranged along the first and second directions. There can be a one-to-one correspondence between the microlenses and the first openings. For each first opening in at least a majority of the first openings, the first opening defines a voided region having a top major surface facing the first major surface and an opposite bottom major surface facing the second major surface. In a cross-section of the optical layer substantially perpendicular to optical layer, the optical layer includes a plurality of nanoparticles concentrated along at least one of the top and bottom major surfaces of the voided regions. In some embodiments, the first mask layer includes a first material and the nanoparticles include at least one of the first material or an oxide of the first material.

In some aspects, the present disclosure provides an optical layer including: a structured first major surface and an opposite second major surface, the structured first major surface including a plurality of microlenses arranged along orthogonal first and second directions; and an embedded optically opaque first mask layer disposed between and spaced apart from the first and second major surfaces. The first mask layer defines a plurality of through first openings therein arranged along the first and second directions. There can be a one-to-one correspondence between the microlenses and the first openings. For each first opening in at least a majority of the first openings, the first opening defines a voided region having a top major surface facing the first major surface and an opposite bottom major surface facing the second major surface. In a cross-section of the optical layer substantially perpendicular to optical layer, the top and bottom surfaces have a separation closer to a center of the voided region greater than a separation closer to an edge of the voided region. At least one of the top and bottom major surfaces can have a surface roughness in a range of 10 nm to 200 nm.

In some aspects, the present disclosure provides a method of making an optical layer. The optical layer can be any of the optical layers described elsewhere herein. The method can include irradiating an embedded optically opaque mask layer through a plurality of microlenses to form a plurality of through first openings in the mask layer.

In some aspects, the present disclosure provides an optical system including an optical element and a refractive component. The optical element includes a lens layer including a plurality of microlenses arranged along orthogonal first and second directions, and an optically opaque first mask layer spaced apart from the lens layer and defining a plurality of through first openings therein arranged along the first and second directions. There is a one-to-one correspondence between the microlenses and the first openings, such that for each microlens, the microlens and corresponding first opening are substantially centered on a straight line. Each straight line makes a same oblique angle with the lens layer. The refractive component extends along the first and second directions and is disposed proximate the optical element such that for a least one first light beam incident on the refractive component along a third direction substantially orthogonal to the lens layer, the refractive component splits the first light beam into 2 to 9 beam segments exiting the refractive component along respective 2 to 9 primary directions. A first primary direction in the 2 to 9 primary directions is substantially parallel to each straight line.

In some aspects, the present disclosure provides an optical system including a refractive component, an optical element, a light source and an optical sensor. The refractive component extends along orthogonal first and second directions such that for at least one first light beam incident on the refractive component along a third direction substantially orthogonal to the first and second directions, the refractive component splits the first light beam into 2 to 9 beam segments exiting the refractive component along respective 2 to 9 primary directions. The 2 to 9 primary directions include a first primary direction. The optical element is disposed proximate the refractive component such that at least 45% of light in the beam segments that is incident on the optical element along the first primary direction, but not any other primary direction, is transmitted through the optical element. The light source is disposed to emit light along a direction substantially parallel to a second primary direction in the 2 to 9 primary directions. The optical sensor is disposed to receive light transmitted through the optical element along the first primary direction.

BRIEF DESCRIPTION OF THE DRAWINGS

FIGS. 5A-5D are schematic cross-sectional views of portions of optical elements or layers;

FIGS. 10A-10B are schematic views of maximum projected areas of optical elements and refractive components;

FIG. 11 is a schematic cross-sectional view of a refractive component;

FIGS. 12A-12C are schematic conoscopic plots;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

For some applications, such as smartphone or tablet computer applications, it is desired to place a fingerprint sensor behind a liquid crystal display (LCD). However, liquid crystal displays often include a refractive component, such as crossed prism films, behind a liquid crystal display panel. Light reflected from a fingerprint is typically split into multiple beam segments by the refractive component and this can reduce the quality of the optical image of the fingerprint when incident on the sensor. According to some embodiments, optical elements, layers, and systems which avoid or substantially reduce this image quality reduction are provided.

Figure 1:
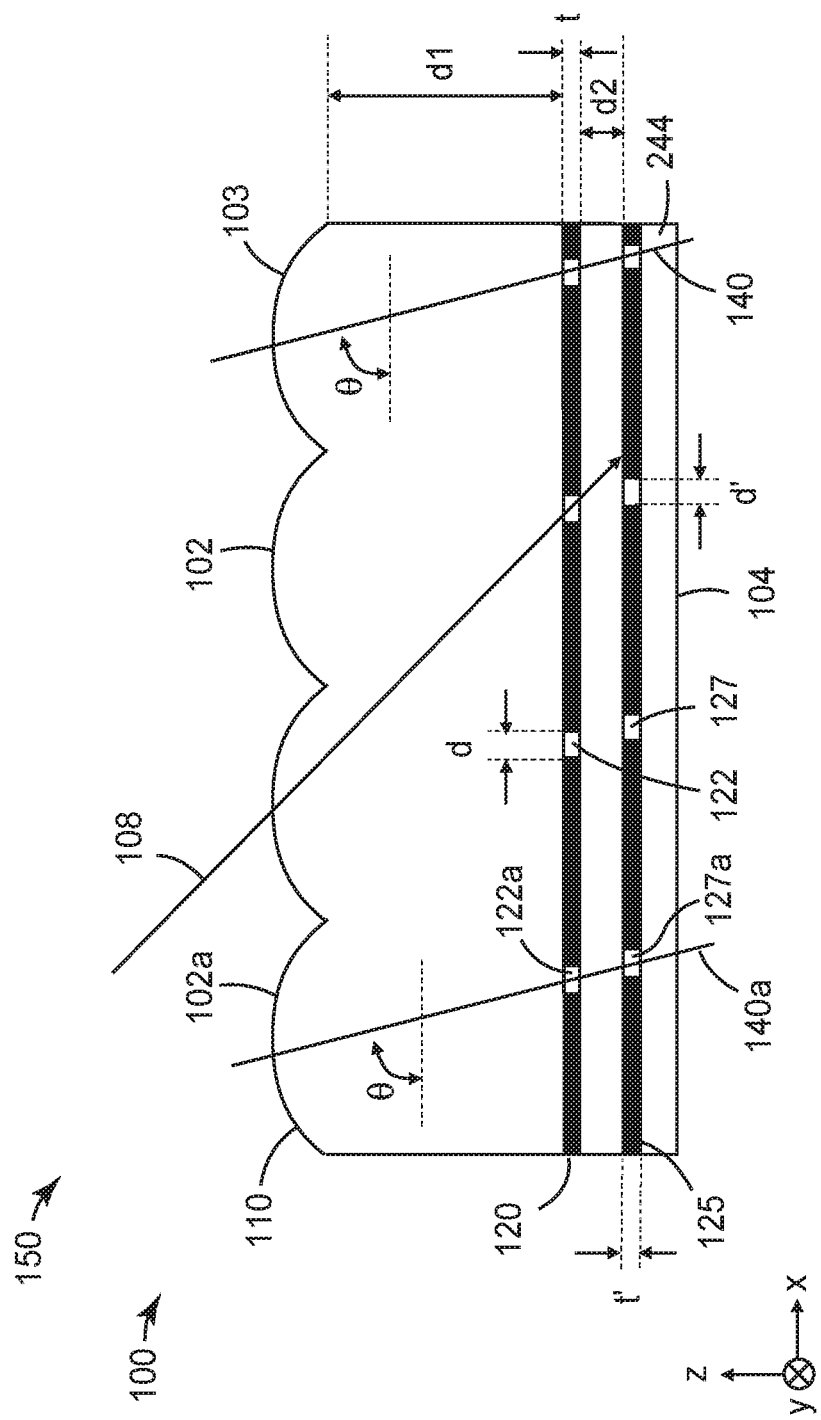
FIG. 1 is a schematic cross-sectional view of an optical system.

FIG. 1 is a schematic cross-sectional view of an optical system 150 including a lens layer 110, an optically opaque first mask layer 120, and an optically opaque second mask layer 125. In some embodiments, an optical element or layer 100 includes each of the lens layer 110 and the first and second mask layers 120 and 125. The optical element or layer 100 can have a structured first major surface 103 and an opposite second major surface 104. In other embodiments, different optical elements may include one or more of the different layers. For example, a first optical element may include the lens layer 110 and the first mask layer 120, and a second optical element spaced apart from the first optical element may include the second mask layer 125.

The lens layer 110 includes a plurality of microlenses 102 arranged (e.g., in a regular array) along orthogonal first and second directions (x- and y-directions). The optically opaque first mask layer 120 is spaced apart from the lens layer 110 by a distance d1, which can be in a range of 2 to 35 micrometers, for example. The optically opaque first mask layer 120 defines a plurality of through first openings 122 therein arranged along the first and second directions. The optically opaque second mask layer 125 is spaced apart from the lens and first mask layers 110 and 120 and defines a plurality of through second openings therein 127 arranged along the first and second directions. The first mask layer 120 is disposed between the lens and second mask layers 100 and 125. The second mask layer 125 is spaced apart from the first mask layer 120 by a distance d2 which can be in a range of 1 to 20 micrometers, for example. In some embodiments, d2<d1, or d2<0.7 d1, or d2<0.5 d1. There can be a one-to-one correspondence between the microlenses 102 and the first and second openings 122 and 127 (i.e., for each microlens 102, one first opening 122 and one second opening 127 corresponds to the microlens), such that for each microlens 102, the microlens and corresponding first and second openings 122 and 127 are substantially centered on a straight line 140 making a same oblique angle θ with the lens layer 110. For example, microlens 102a corresponds to first and second openings 122a and 127a and the microlens 102a and the corresponding first and second openings 122a and 127a are substantially centered on a straight line 140a. A lens or opening can be described as substantially centered on the straight line 140 when the line passes through a center of the lens or opening or passes through the center to within about 20 percent, or within about 10 percent, or within about 5 percent of a diameter of the lens or opening, respectively, for example.

A microlens is generally a lens with at least two orthogonal dimensions (e.g., a height and a diameter, or a diameter along two axes) less than 1 mm and greater than 100 nm. The microlenses can have an average diameter in a range of 10 micrometers to 100 micrometers, for example. The microlenses can have an average radius of curvature in a range of 5 micrometers to 50 micrometers, for example. The microlenses can be spherical or aspherical microlenses, for example. It has been found that aspherical microlenses can provide improved optical properties (e.g., improved focus) for light incident at a desired off-axis angle (e.g., along the lines 140). The optical element or layer 100, or other optical elements or layers described elsewhere herein, can have a total thickness in a range of 10 micrometers to 100 micrometers, for example.

A mask layer can be described as optically opaque when less than 20%, or less than 15%, or less than 10%, or less than 5%, or less than 3%, of unpolarized visible light normally incident on the layer in a region between openings is transmitted through the layer. A mask layer can be optically absorptive or optically reflective. Suitable mask layers include metal layers (e.g., vapor deposited or sputtered), metal oxide layers, dark material (e.g., including optically absorptive dye(s)) coatings, and optically absorptive or reflective films, for example. The mask layers can a sufficient thickness for the material to be suitably optically opaque. For example, the average thicknesses t and t' of the mask layers may each be in a range of 5 nm to 5 micrometers. In some embodiments, t and/or t' is in a range of 10 nm to 500 nm, or 10 nm to 150 nm, or 15 nm to 100 nm, or 15 nm to 50 nm, or 20 nm to 40 nm, for example.

The first and second mask layers 120 and 125 can be included to limit light transmitted through the optical element to substantially only light along the line 140. The second mask layer 125 can be included to reduce cross-talk where light incident on one microlens is transmitted through an opening corresponding to another microlens. For example, light ray 108 which would have otherwise resulted in cross-talk is blocked by the second mask layer 125. In some embodiments, the second mask layer 125 is omitted. In some embodiments, a pixelated photosensor can be used instead of the second mask layer 125 as described further elsewhere herein. Related optical elements are described in International Appl. No. IB2019/056781 (Yang et al.).

In some embodiments, the first openings 122 are physical openings. Physical openings have material removed from the mask layer so that physical holes are present. For example, physical openings or holes can be formed in an optically opaque layer by laser ablation. In some embodiments, the first openings are optical openings. Optical openings have material treated so that light can be transmitted through the optical openings even if material is present in the optical openings. For example, optical openings can be formed in an optically opaque layer by bleaching (e.g., an optically opaque layer incorporating dyes can be photobleached or thermobleached such that the bleached dyes are no longer optically absorptive). Optical openings can be formed in a birefringent reflective film by reducing birefringence in the openings as generally described in U.S. Pat. No. 9,575,233 (Merrill et al.), for example. An absorption overcoat can optionally be applied to the optical film to increase the absorption of energy from the laser. In some embodiments, the second openings 127 are physical openings. In some embodiments, the second openings 127 are optical openings. In some embodiments, the first openings 122 have an average diameter d in a range of 500 nm to 50 micrometers, or 1 micrometer to 40 micrometers, or 2 micrometers to 30 micrometers, or 3 micrometers to 20 micrometers, or 5 micrometers to 15 micrometers, for example. In some embodiments, the second openings 127 have an average diameter d' in a range of 500 nm to 50 micrometers, or 1 micrometer to 40 micrometers, or 2 micrometers to 30 micrometers, or 3 micrometers to 20 micrometers, or 5 micrometers to 15 micrometers, for example.

In some embodiments, for each first opening in at least a majority of the first openings 122, the first opening defines a voided region. The voided region can have a top major surface facing the first major surface 103 and an opposite bottom major surface facing the second major surface 104. In some embodiments, in at least one cross-section of the optical layer substantially perpendicular to optical layer, the optical layer includes a plurality of nanoparticles concentrated along at least one of the top and bottom major surfaces of the voided regions, as described further elsewhere. In some embodiments, in a cross-section of the optical layer substantially perpendicular to optical layer, the top and bottom surfaces have a separation closer to a center of the voided region greater than a separation closer to an edge of the voided region. In some such embodiments or in other embodiments, at least one of the top and bottom major surfaces has a surface roughness in a range of 10 nm to 200 nm or in a range described elsewhere.

In some embodiments, an additional layer 244 is disposed on the second mask layer 125 opposite the first mask layer 120. In other embodiments, the additional layer 244 is omitted. In some embodiments, for each second opening in at least a majority of the second openings 127, the second opening defines a voided region. The voided region can have a top major surface facing the first major surface 103 and an opposite bottom major surface facing the second major surface 104. In some embodiments, in at least one cross-section of the optical layer substantially perpendicular to optical layer, the optical layer includes a plurality of nanoparticles concentrated along at least one of the top and bottom major surfaces of the voided regions, as described further elsewhere. In some embodiments, in a cross-section of the optical layer substantially perpendicular to optical layer, the top and bottom surfaces have a separation closer to a center of the voided region greater than a separation closer to an edge of the voided region. In some such embodiments or in other embodiments, at least one of the top and bottom major surfaces has a surface roughness in a range of 10 nm to 200 nm or in a range described elsewhere.

In some embodiments, further additional layers are included. For example, an additional layer, such as a primer layer or a tie layer, can be disposed at any one or more interfaces between adjacent layers depicted in FIG. 1 in order to improve bonding between the adjacent layers.

Spatially related terms, including but not limited to, "top" and "bottom" are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Figure 2A:
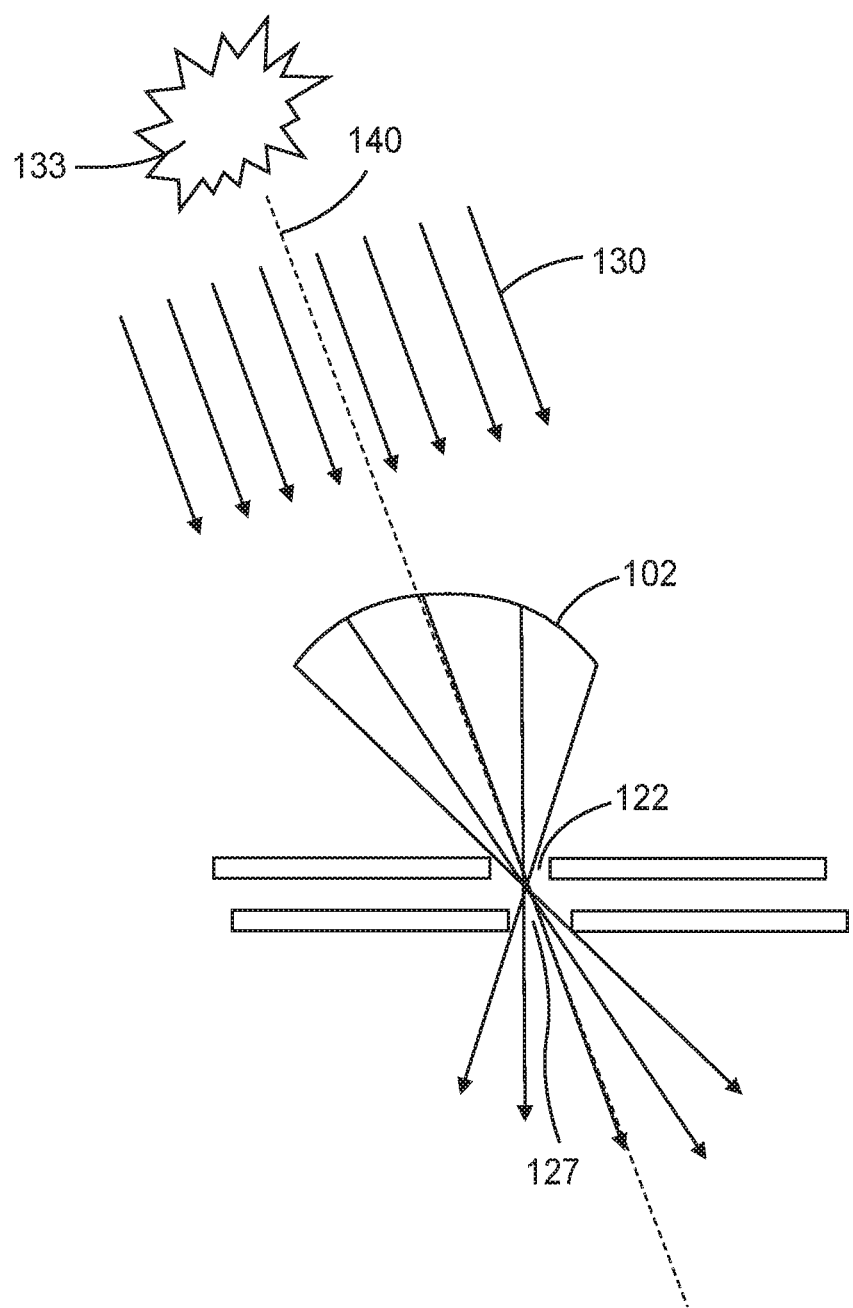
FIGS. 2A-2C schematically illustrate light incident on a microlens.
Figure 2B:
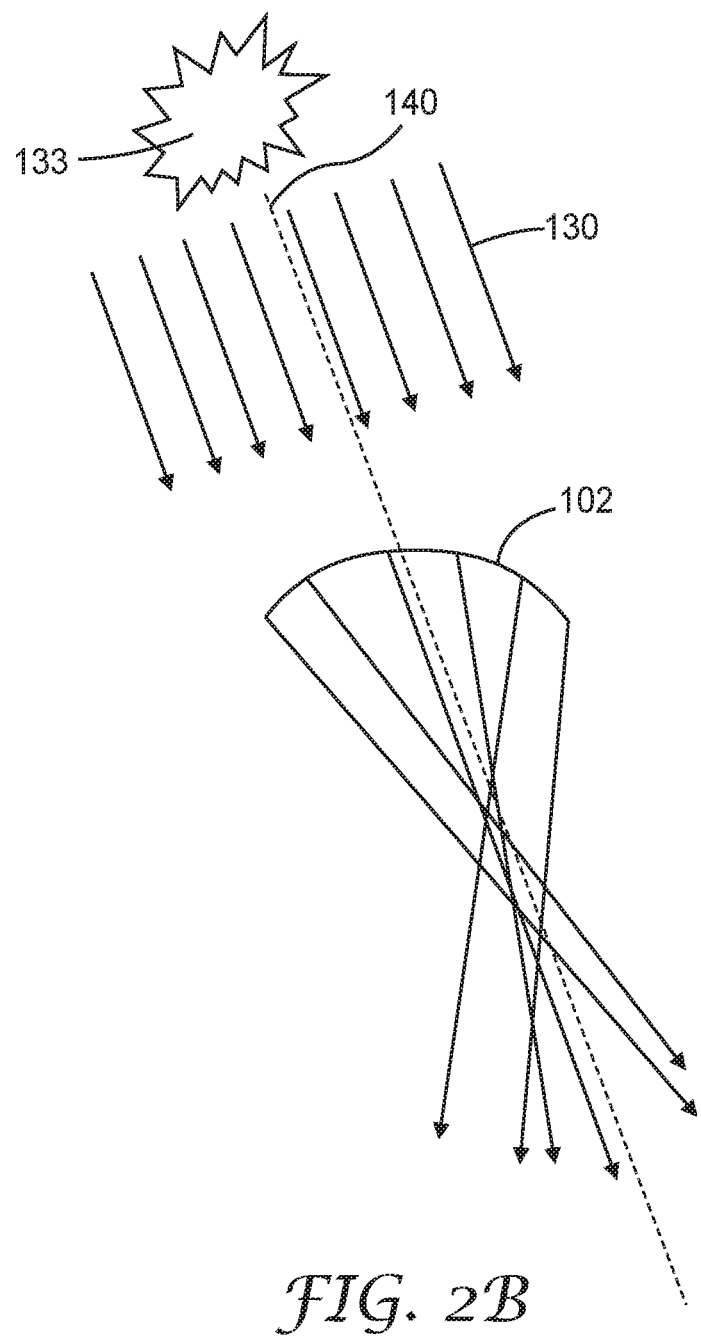
Figure 2C:
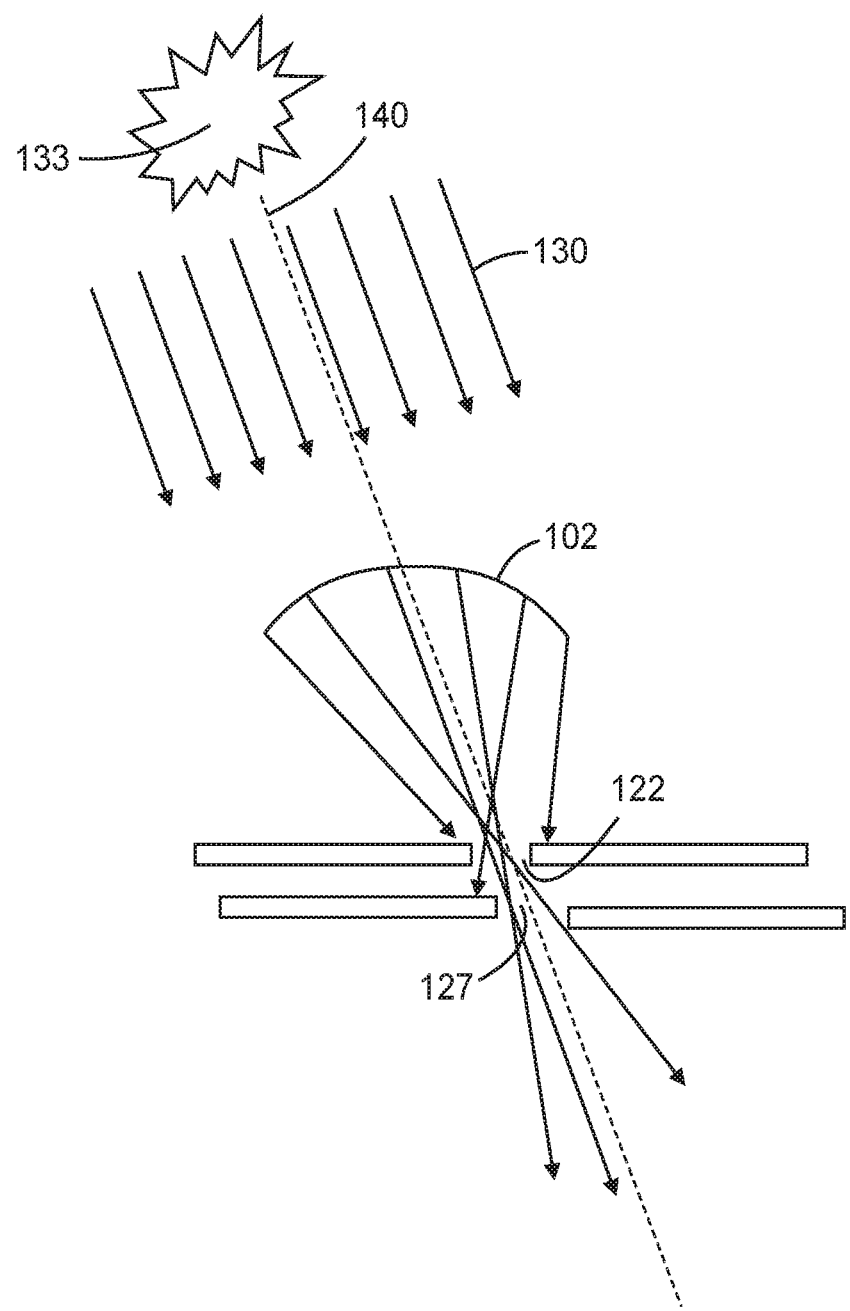

FIG. 2A is a schematic illustration of a light 130 incident on a microlens 102, according to some embodiments. FIG. 2B is a schematic illustration of a light 130 incident on a microlens 102, according to some embodiments where the microlens causes an image quality degradation. FIG. 2C is a schematic illustration of a light 130 incident on the microlens 102 where at least one of first and second openings 122 and 127 is sized so as to reduce an image quality degradation due to the microlens. In some embodiments, when an image light 130 carrying an image 133 is incident on the microlens 102 along the straight line 140, where the image light 130 substantially fills the microlens 102, greater than about 35%, or greater than about 40%, or greater than about 45%, or greater than about 50% of the incident image light is transmitted by the second opening 127. In some embodiments, at least one of the first and second openings 122 and 127 is sized so as to reduce an image quality degradation due to the microlens. The image light can be described as substantially filling the microlens when it fills the microlens or when it fills at least 70%, or at least 80%, or at least 90% of an area of the outer surface of the microlens, for example.

Figure 3:
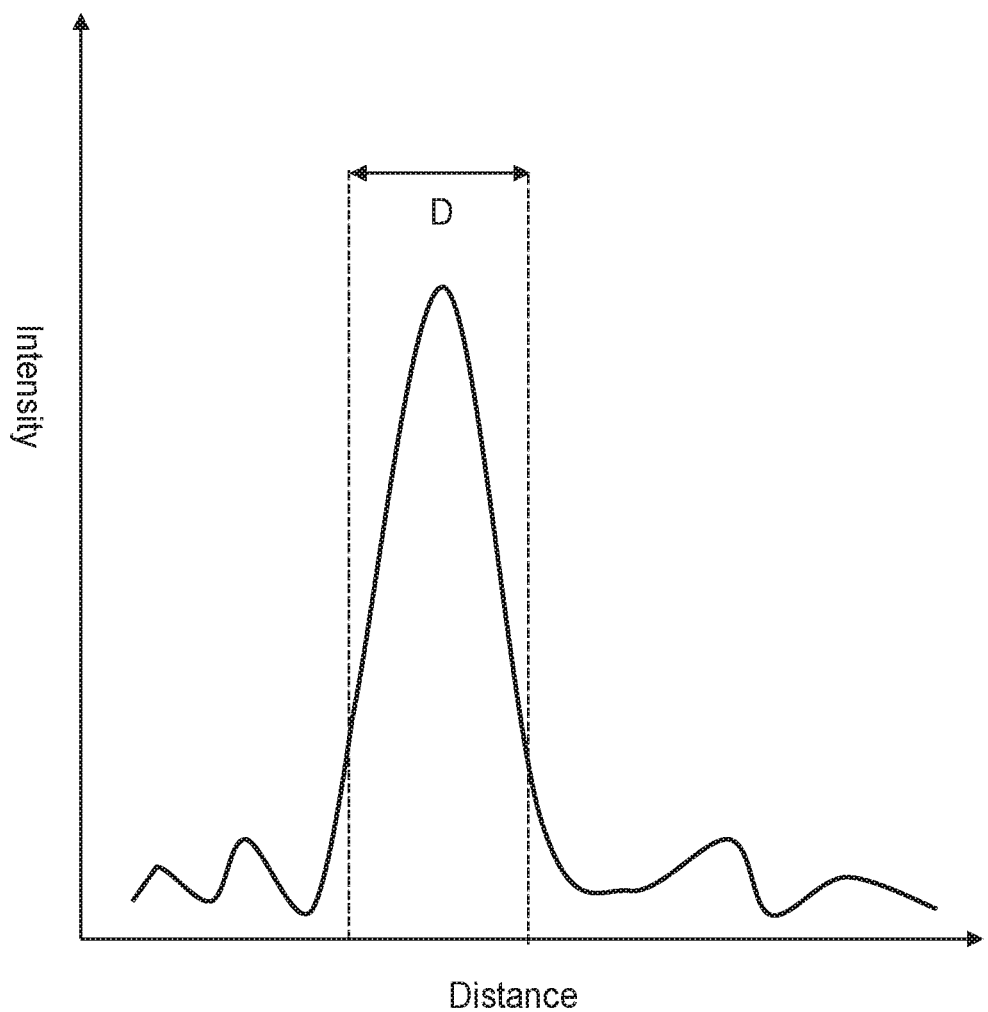
FIG. 3 is a schematic plot of an intensity distribution of light transmitted through a microlens.

FIG. 3 is a schematic plot of an intensity distribution at a nominal image plane of light transmitted through a microlens that causes an image quality degradation. A diameter D of an opening in a mask layer that is sized so as to reduce an image quality degradation due to the microlens is illustrated. A microlens can cause an image quality degradation, for example, when the surface of the microlens deviates from an ideal shape due to manufacturing constraints. For example, a tool used to form the microlenses may have a surface that is formed by removing material from a layer that results in a plurality of facets that approximate but do not precisely follow the ideal shape of the microlens.

In some embodiments, the optical system is configured to detect a fingerprint. Light that propagates through the optical system from any point at the front surface of the display panel preferably has a limited spatial extent when incident on a fingerprint sensor in order to form a desired (e.g., suitably sharp) fingerprint image. This spatial extent can be quantified by the point spread function of the optical system. The larger the spatial spread of the point spread function, the blurrier is the fingerprint image. According to some embodiments, it has been found that including an optical element described herein in the optical system can reduce a width of the point spread function. In some embodiments, the optical system has a point spread function for light incident on the optical system from a Lambertian point source that has a full width at half maximum (FWHM) at an optical sensor disposed behind the optical element (see, e.g., FIGS. 8-9) of less than about 300 micrometers, or less than about 200 micrometers, or less than about 150 micrometers, or less than about 100 micrometers.

As described further elsewhere herein (see, e.g., FIGS. 8-9), in some embodiments, an optical element 100 (or 300, for example) includes the lens layer 110 and the first and second mask layers 120 and 125, and the optical system 150 further includes: a refractive component 160 extending along the first and second directions and disposed proximate the optical element 100 such that for at least one first light beam 230 incident on the refractive component along a third direction (−z direction) substantially orthogonal (e.g., within 30 degrees, or within 20 degrees, or within 10 degrees of orthogonal) to the lens layer 110, the refractive component splits the first light beam into 2 to 9 beam segments 112, 114 exiting the refractive component along respective 2 to 9 primary directions 131, 132, a first primary direction 131 in the 2 to 9 primary directions being substantially parallel (e.g., within 30 degrees, or within 20 degrees, or within 10 degrees of parallel) to each straight line 140. The at least one first light beam 230 can be any light beam having a width larger than a width of prisms (or other refractive elements) in the refractive component, for example. Other light beams with a narrower width may be split into fewer than 2 to 9 primary directions. Each beam segment is a transmitted portion of the incident beam that propagates generally along a same direction which is referred to as a primary direction.

Figure 12B:
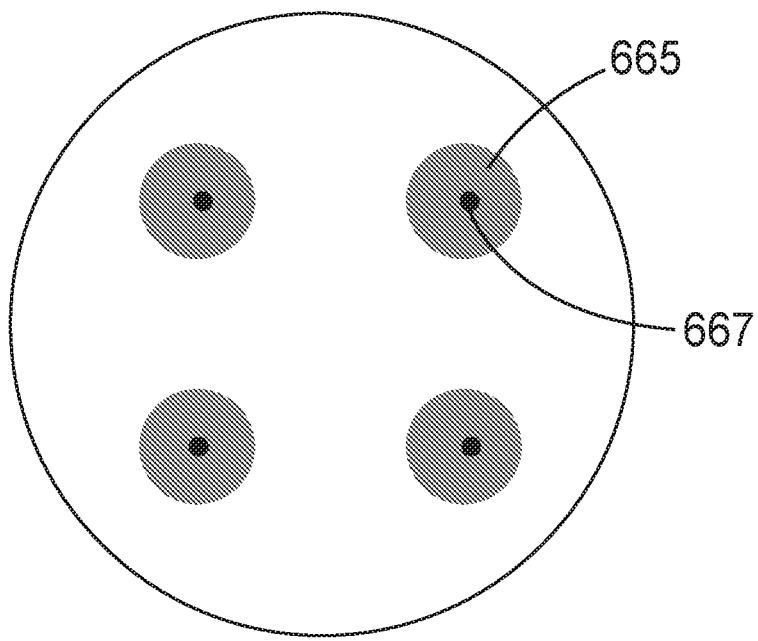
Figure 12C:
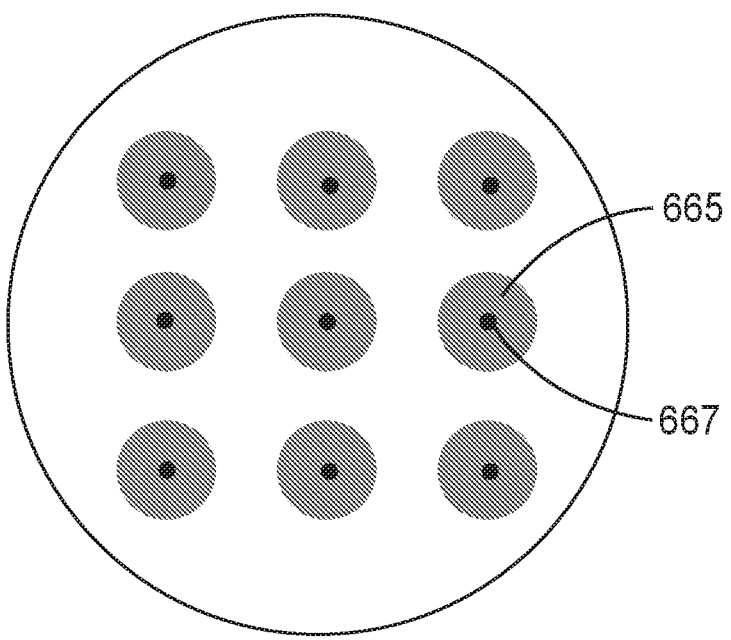

The beam segments and primary directions can be identified from a conoscopic plot of the transmitted light intensity, for example, as described further elsewhere herein (see, e.g., FIGS. 12A-12C).

Figure 8:
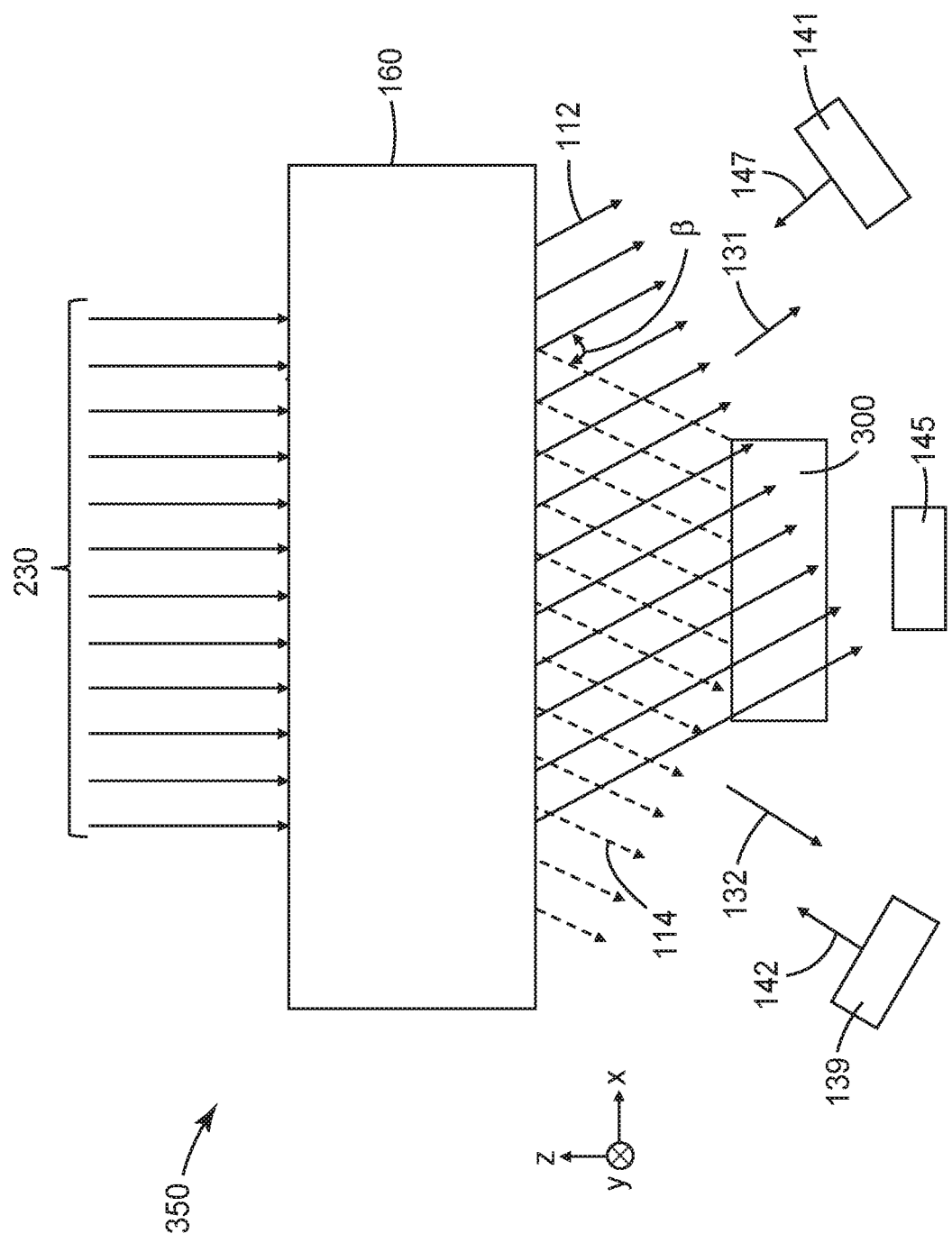
FIGS. 8-9 are schematic cross-sectional views of optical systems.
Figure 9:
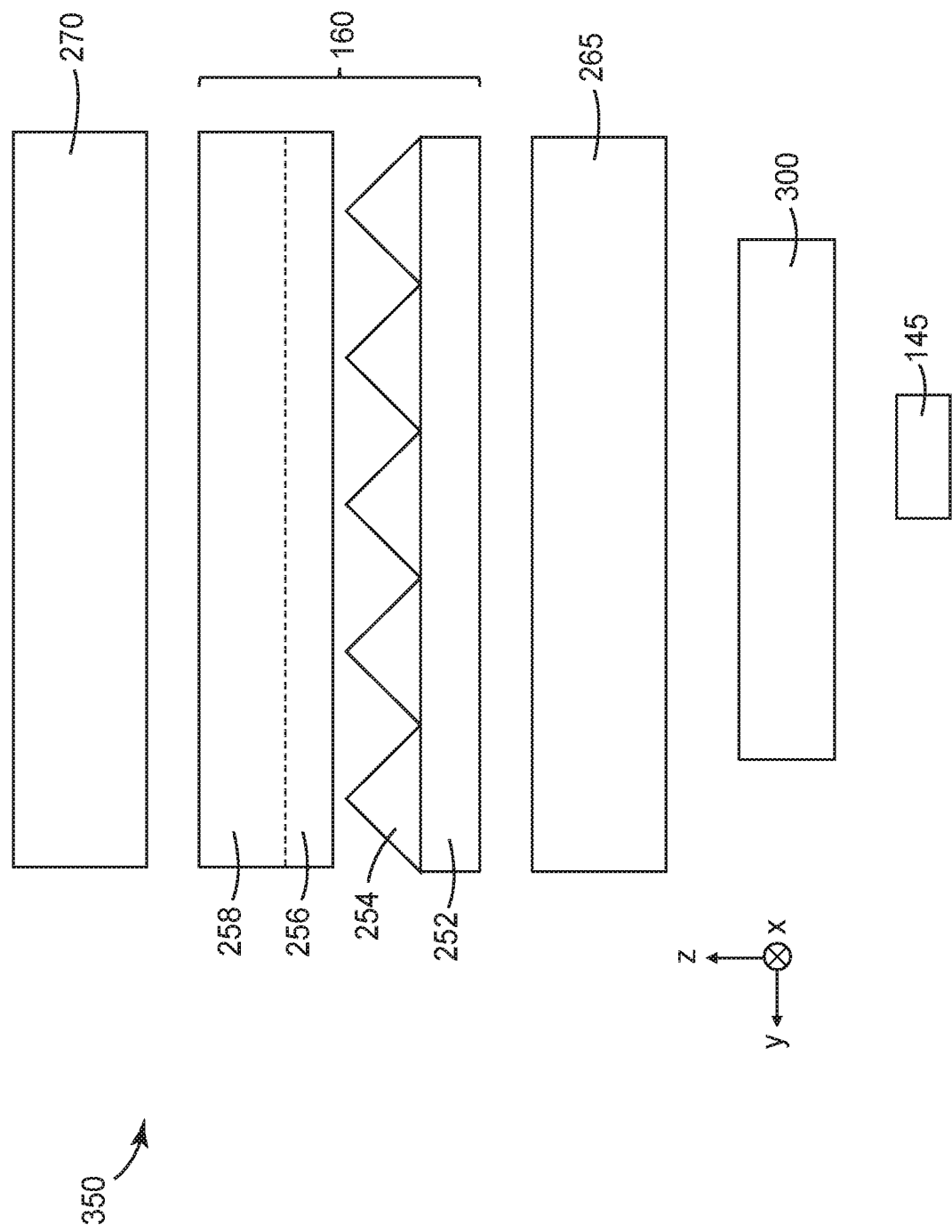

In some embodiments, the optical system 150 further includes a liquid crystal display 270 extending along the first and second directions, a lightguide 265 disposed to illuminate the liquid crystal display, a refractive component 160 disposed between the liquid crystal display 270 and the lightguide 265, and an optical sensor 145 disposed proximate the lightguide 265 opposite the liquid crystal display 270 (see, e.g., FIG. 9). In some embodiments, an optical element 100 (or 300, for example) including the lens layer 110 and the first and second mask layers 120 and 125 is disposed between the lightguide 265 and the optical sensor 145 such that the second mask layer 125 faces the optical sensor 145 (e.g., optical element or layer 100 of FIG. 1 may be placed as indicated in FIG. 8 for optical element 300 oriented as indicated by the x-y-z coordinate systems of FIGS. 1 and 8).

In some embodiments, each sublayer (e.g., lens layer 110, first and second mask layers 120 and 125) of the optical element 100 is bonded to an adjacent layer of the optical element 100. In such embodiments, the optical element 100 may be referred to as an optical layer. In some embodiments, the first mask layer 120 is embedded in the optical layer. In some embodiments, an additional layer 244 is disposed on the second mask layer 125 opposite the first mask layer 120 such that the second mask layer 125 is also an embedded layer. In some embodiments, the second mask layer 125 can be omitted.

Figure 4:
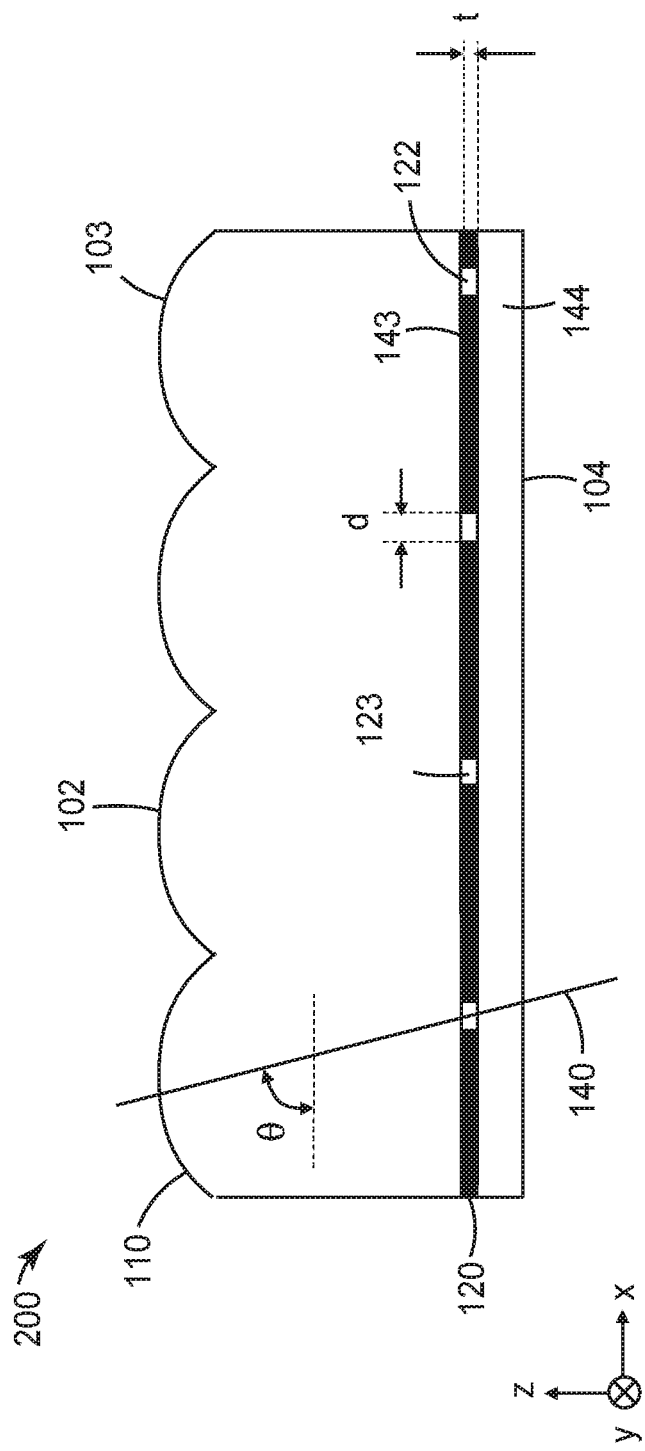
FIG. 4 is a schematic cross-sectional view of an optical element or layer.

FIG. 4 is a schematic cross-sectional view of optical element or layer 200. In some embodiments, the optical element or layer 200 includes a structured first major surface 103 and an opposite second major surface 104, where the structured first major surface 103 includes a plurality of microlenses 102 arranged along orthogonal first and second directions (x- and y-directions). The optical layer further includes an embedded optically opaque first mask layer 120 disposed between and spaced apart from the first and second major surfaces 103 and 104. The first mask layer 120 defines a plurality of through first openings 122 therein arranged along the first and second directions. There can be a one-to-one correspondence between the microlenses and the first openings. In some embodiments, for each first opening in at least a majority of the first openings 122, the first opening defines a voided region 123.

In some embodiments, the optical element or layer 200 is made by micro-replicating the plurality of microlenses 102 using a cast and ultra-violet (UV) cure process, for example, where a resin is cast on a substrate and cured in contact with a replication tool surface as generally described in U.S. Pat. No. 5,175,030 (Lu et al.), U.S. Pat. No. 5,183,597 (Lu) and U.S. Pat. No. 9,919,339 (Johnson et al.), and in U.S. Pat. Appl. Publ. No. 2012/0064296 (Walker, J R. et al), for example. The optically opaque first mask layer 120 can then be formed by coating an opaque material, for example, onto to a major surface 143 of the microlens substrate opposite the first major surface 103. The opaque material can a sufficient thickness for the material to be suitably optically opaque. For example, the opaque material may be 10 nm to 5 micrometers thick. In some embodiments, the opaque material is 10 nm to 500 nm (e.g., 15 nm to 150 nm, or 15 nm to 100 nm, or 20 nm to 50 nm) thick aluminum which may be coated using standard magnetron sputtering, for example. An additional layer 144 can be coated or laminated onto the opaque material layer. An optional second mask layer can then be deposited on the additional layer 144, if desired. An optional second additional layer can then be disposed on the second mask layer opposite the additional layer 144, if desired. The openings 122 can then be formed by laser ablation through the microlenses 102, for example. Suitable lasers include fiber lasers such as a 40 W pulsed fiber laser operating a wavelength of 1070 nm, for example. In some embodiments, the layer 120 is formed by applying a reflective multilayer optical film onto to major surface 143. Physical or optical through openings can then be formed in the optical film by irradiating with a laser through the microlenses. Creating apertures in a layer using a laser through a microlens array is generally described in US2007/0258149 (Gardner et al.), for example. Other suitable methods of forming the openings include microprinting and photolithographic techniques (e.g., including using the microlens layer to expose a photolithographic mask).

In some embodiments, a method of making an optical layer is provided. The method can include providing a first layer that includes a structured first major surface 103 and an opposite second major surface 104. The structured first major surface 103 includes a plurality of microlenses 102 arranged along orthogonal first and second directions. The first layer includes an embedded optically opaque first mask layer disposed between and spaced apart from the first and second major surfaces. The method can further include irradiating the first mask layer through the plurality of microlenses 102 to form a plurality of through first openings 122 in the first mask layer arranged along the first and second directions. There can be a one-to-one correspondence between the microlenses and the first openings. In some embodiments, the first layer further includes an optically opaque second mask layer where the first mask layer is disposed between and spaced apart from the first major surface 103 and the second mask layer. Irradiating the first mask layer step can further include irradiating the second mask layer through the plurality of microlenses 102 and through the first mask layer to form a plurality of through second openings 127 in the second mask layer arranged along the first and second directions. There can be a one-to-one correspondence between the microlenses 102 and the second openings 127.

FIGS. 5A-5D are schematic cross-sectional views of regions in optical elements or layers near an embedded optically opaque first mask layer 120 according to some embodiments. In some embodiments, for each first opening in at least a majority of the first openings 122, the first opening defines a voided region 723 having a maximum thickness h greater than an average thickness t of the first mask layer 120. In some embodiments, the first mask layer 120 has an average thickness t, the first openings 122 have an average largest lateral dimension d, and t/d<0.05, or t/d<0.01, or t/d<0.005. In some embodiments, for each first opening in the at least a majority of the first openings, the voided region 123 or 723 extending through the first opening is substantially laterally coextensive with the first opening. A voided region can be described as substantially laterally coextensive with the first opening when the voided region fills at least 60 percent (or at least 70% or at least 80% or at least 90%) of a total area of the first opening. FIG. 5A is a schematic cross-sectional view of a portion of an optical layer that includes a mask layer 120 including openings 122 and voided regions 723 laterally coextensive with the openings 122. FIG. 5B is a schematic cross-sectional view of a portion of an optical layer that includes a mask layer 120 including openings 122 and voided regions 723 substantially laterally coextensive, but not entirely laterally coextensive, with the openings 122. A voided region is a region where solid material has been removed. Air or gas may be present in a voided region.

In some embodiments, the voided regions 723 have a top major surface facing the first major surface 103 and an opposite bottom major surface facing the second major surface 104, where in a cross-section of the optical layer substantially perpendicular to optical layer, the top and bottom surfaces have a separation h1 (see FIG. 5C) closer to a center of the voided region and a separation h2 closer to an edge of the voided region, where h1>h2. At least one of the top and bottom major surfaces can have a surface roughness R. The surface roughness R can be at least 10 nm, or at least 12 nm, or at least 15 nm, or at least 20 nm, for example. The surface roughness R can be no more than 200 nm, or no more than 150 nm, or no more than 120 nm, for example. The surface roughness can result from laser ablation of the mask layer. For example, laser ablation of the mask layer can roughen a surface of the voided region 723 by depositing nanoparticles along the surface. The surface roughness refers to the mean deviation of the surface from a mean smooth surface.

In some embodiments, for each first opening in at least a majority of the first openings 122, the first opening defines a voided region 723 having a top major surface 171 facing the first major surface 103 and an opposite bottom major surface 173 facing the second major surface 104. In some embodiments, as schematically illustrated in FIG. 5D, (e.g., in a cross-section of the optical layer substantially perpendicular to optical layer) the optical layer includes a plurality of nanoparticles 177 concentrated along at least one of the top and bottom major surfaces 171 and 173 of the voided regions. In some embodiments, in a cross-section of the optical layer substantially perpendicular to optical layer (e.g., in the x-z cross-section schematically illustrated in FIG. 5D), the top and bottom surfaces 171 and 173 have a separation closer to a center of the voided region greater than a separation closer to an edge of the voided region 723 (e.g., as schematically illustrated in FIG. 5A where the separation near the center is h and the separation near an edge is about t, or as schematically illustrated in FIG. 5C where h1>h2). At least one of the top and bottom major surfaces can have a surface roughness in a range of 10 nm to 200 nm, or in a range described elsewhere.

In some embodiments, the top and bottom surfaces 171 and 173 are substantially concave towards one another (e.g., concave toward one another along greater than 50% or at least 60% or at least 70% of an area of one or both of the surfaces).

In some embodiments, the first mask layer 120 includes a first material and the nanoparticles 177 include at least one of the first material or an oxide of the first material. In some embodiments, the first material is a metal. Any suitable metal can be used for the first material. For example, the metal can be aluminum, titanium, chromium, zinc, tin, tungsten, gold, silver, or alloys thereof. In some embodiments, the nanoparticles include an oxide of the metal. For example, the nanoparticles can include aluminum oxide, titanium oxide, chromium oxide, zinc oxide, or combinations thereof. In some embodiments, the nanoparticles 177 are or include aluminum and aluminum oxide. In some embodiments, the nanoparticles 177 include aluminum oxide at greater than about 50 weight percent.

In some embodiments, at least 90% of the nanoparticles 177 have an average diameter less than about 150 nm, or less than about 100 nm. In some embodiments, at least 90% of the nanoparticles have an average diameter greater than about 1 nm, or greater than about 5 nm, or greater than about 10 nm. The average diameter of a nanoparticle is the diameter of a sphere having a volume equal to that of the nanoparticle.

In some embodiments, the optical layer includes a first polymeric layer disposed between the first major surface and the mask layer, and a second polymeric layer disposed between the mask layer and the second major surface. In some embodiments, at least one of the first and second polymeric layers comprises a plurality of second nanoparticles dispersed uniformly therein. For example, the second nanoparticles can be included to increase the refractive index of the layer as is known in the art (see, e.g., U.S. Pat. No. 8,202,573 (Pokorny et al.)).

In some embodiments, the optical element or layer 200 schematically illustrated in FIG. 4, further includes an optically opaque second mask layer 125 (see, e.g., FIG. 1) defining a plurality of through second openings 127 therein arranged along the first and second directions, where the first mask layer 120 disposed between and spaced apart from the first major surface 103 and the second mask layer 125, where there can be a one-to-one correspondence between the microlenses and the second openings. In some embodiments, for each microlens, the microlens and corresponding first and second openings are substantially centered on a straight line making a same oblique angle with the first mask layer. The first and/or second openings can be as described elsewhere (see, e.g., FIGS. 5A-5D).

Figure 6:
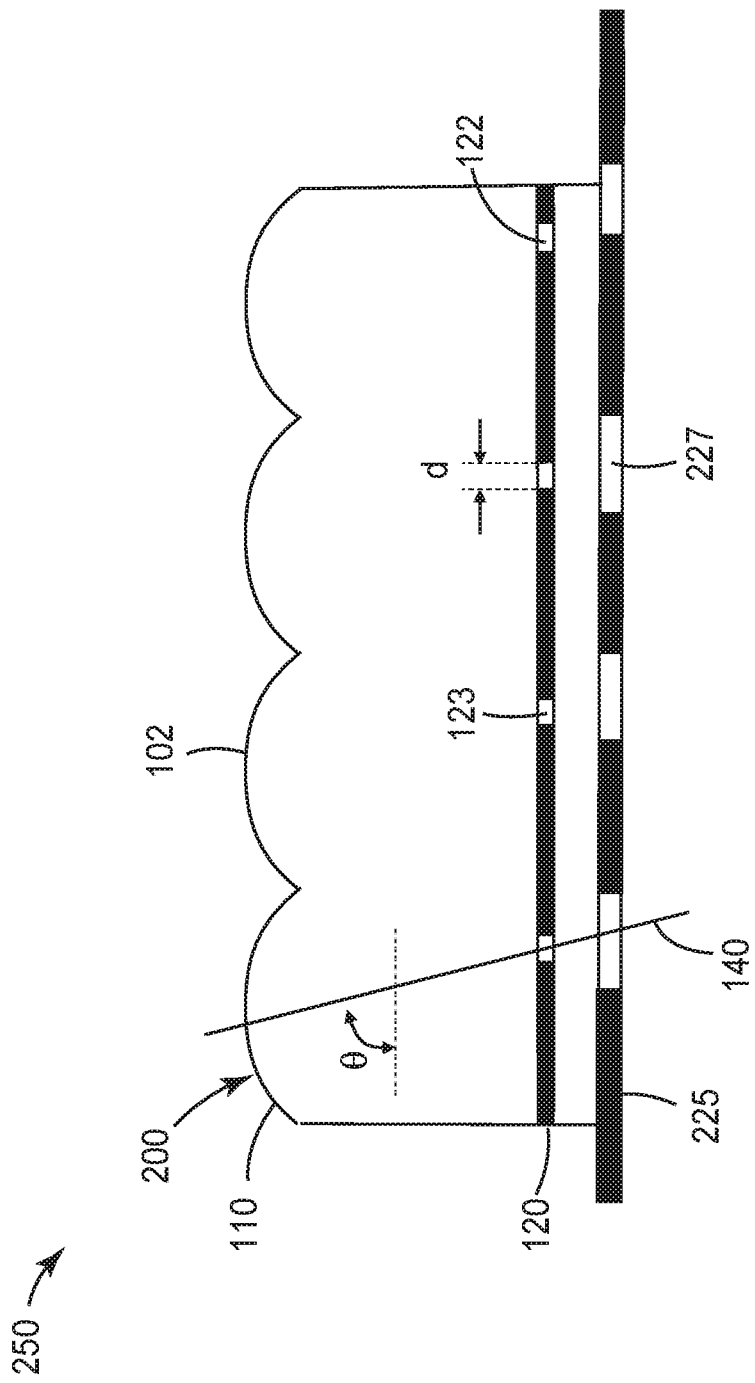
FIG. 6 is a schematic cross-sectional view of an optical system including an optical element or layer.

FIG. 6 is a schematic cross-sectional view of the optical element or layer 200 disposed on a photosensor 225. In some embodiments, an optical system 250 includes the optical element or layer 200 and a photosensor 225 including a plurality of sensor pixels 227. In some embodiments, there is a one-to-one correspondence between the microlenses 102 and the sensor pixels 227, such that for each microlens in at least a majority of the microlenses 102, the microlens 102 and corresponding first openings 122 and sensor pixels 227 are substantially centered on a straight line 140 making a same oblique angle θ with the first mask layer 120.

Figure 7:
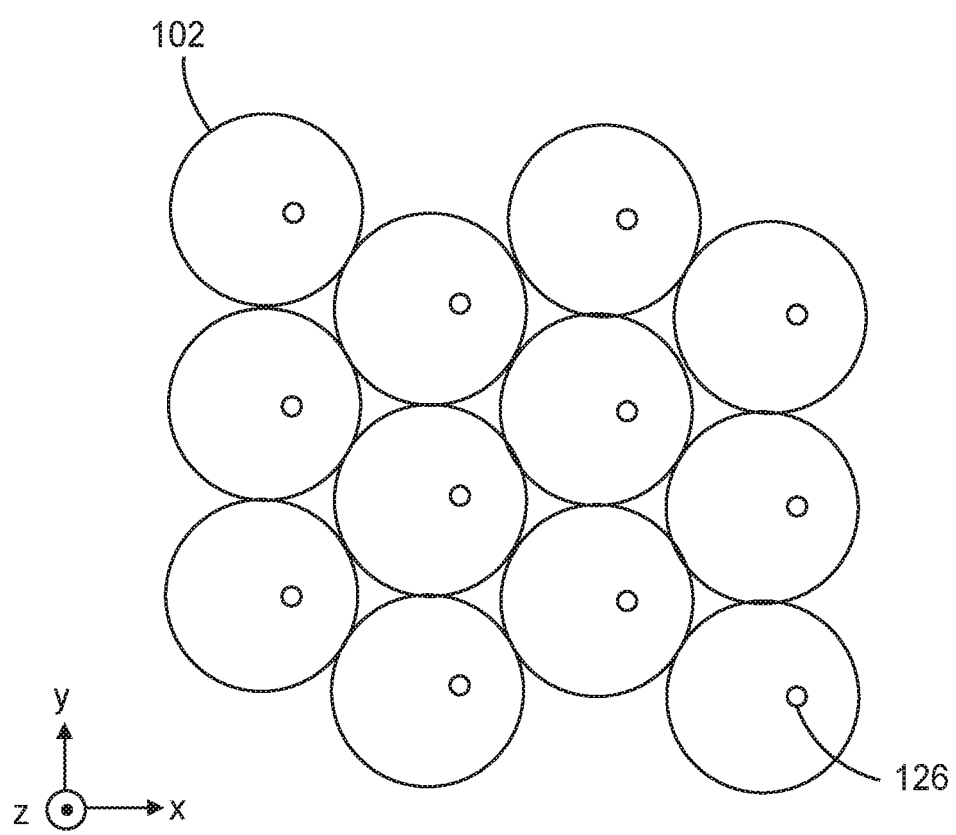
FIG. 7 is a schematic top projected view of an array of microlenses and through openings.

FIG. 7 is a schematic top projected view of pluralities of microlenses 102 and through openings 126 (e.g., corresponding to first through openings 122 or second through openings 127). The microlenses 102 are arranged along orthogonal first and second directions (x- and y-directions) and the openings 126 are arranged along the first and second directions. In the illustrated embodiment, the microlenses 102 and through openings 126 are on a regular triangular array. Other patterns are also possible (e.g., square or rectangular array, other periodic arrays, or irregular patterns).

FIG. 8 is a schematic illustration of an optical system 350 according to some embodiments. FIG. 9 is a schematic illustration of some embodiments of the optical system 350.

In some embodiments, an optical system 350 includes an optical element 300 (e.g., corresponding to 100 or 200) and a refractive component 160. The optical element 300 includes a lens layer 110 including a plurality of microlenses arranged along orthogonal first and second directions (x- and y-directions), and an optically opaque first mask layer 120 spaced apart from the lens layer 110 and defining a plurality of through first openings therein arranged along the first and second directions. In some embodiments, there is a one-to-one correspondence between the microlenses and the first openings, such that for each microlens, the microlens and corresponding first opening are substantially centered on a straight line 140, where each straight line makes a same oblique angle θ with the lens layer 110. In some embodiments, the refractive component 160 extends along the first and second directions and is disposed proximate the optical element such that for at least one first light beam 230 incident on the refractive component along a third direction (−z-direction) substantially orthogonal to the lens layer, the refractive component 160 splits the first light beam into 2 to 9 beam segments 665 (see FIGS. 12A-12C) exiting the refractive component along respective 2 to 9 primary directions 667 (see FIGS. 12A-12C), where a first primary direction 131 in the 2 to 9 primary directions is substantially parallel to each straight line 140.

In some embodiments, the optical element 300 further includes an optically opaque second mask layer 125 spaced apart from the lens and first mask layers 110 and 120 and defining a plurality of through second openings 127 therein arranged along the first and second directions, with the first mask layer 120 disposed between the lens and second mask layers 110 and 125 (see, e.g., FIG. 1). In some embodiments, there is a one-to-one correspondence between the microlenses and the second openings, such that for each microlens 102a and corresponding straight line 140a, the microlens 102a and corresponding first and second openings 122a and 127a are substantially centered on the straight line 140.

In some embodiments, the optical system 350 further includes a photosensor 225 adjacent the optical element 300 (see, e.g., FIG. 6). As described further elsewhere herein, the photosensor 225 can include a plurality of sensor pixels. There can be a one-to-one correspondence between the microlenses and the sensor pixels, such that for each microlens and corresponding straight line, the microlens and corresponding first openings and sensor pixels are substantially centered on the straight line 140.

In some embodiments, for each microlens in at least a majority of microlenses in the plurality of microlenses, at least two of the beam segments 112, 114 are incident on the microlens, where the at least two of the beam segments 112, 114 include a first beam segment 112 propagating along the first primary direction 131. In some embodiments, at least 30%, or at least 40%, or at least 45%, or at least 50%, or at least 55% of light in the beam segments that is incident on the optical element 300 along the first primary direction 131, but not any other primary direction, is transmitted through the optical element 300. In some embodiments, for each primary direction 132 except for the first primary direction 131, no more than 10%, or no more than 5% of light in the beam segment that is incident on the optical element 300 along the primary direction is transmitted through the optical element.

In some embodiments, an optical system 350 includes a refractive component 160 extending along orthogonal first and second directions such that for at least one first light beam 230 incident on the refractive component 160 along a third direction substantially orthogonal to the first and second directions, the refractive component splits the first light beam into 2 to 9 beam segments exiting the refractive component along respective 2 to 9 primary directions, where the 2 to 9 primary directions include a first primary direction 131. In some embodiments, the 2 to 9 primary directions define angles β therebetween, where each angle β is greater than about 30 degrees. In some embodiments, the refractive component 160 includes a first prism film 252 including a first plurality of prisms 254 extending along a first longitudinal direction (x-direction) substantially parallel to the lens layer 110. In some embodiments, the refractive component 160 further includes a second prism film 256 adjacent the first prism film 252. The second prism film 256 can include a second plurality of prisms 258 extending along a second longitudinal direction (y-direction) substantially parallel to the lens layer 110 and substantially orthogonal to the first longitudinal direction.

The optical system 350 can further include an optical element 300 disposed proximate the refractive component 160 such that at least 45% of light (or any of the ranges described elsewhere herein) in the beam segment that is incident on the optical element 300 along the first primary direction 131, but not any other primary direction 132, is transmitted through the optical element 300. The optical system 350 can further include a light source 139 and/or 141 disposed to emit light 142 and/or 147, respectively, along a direction substantially parallel to a second primary direction in the 2 to 9 primary directions. In some embodiments, the light source is an infrared light source. In some embodiments, the optical system 350 includes an infrared diffuser. For example, an infrared diffuser can be positioned between an infrared light source and the touch surface of the display to improve the uniformity of the infrared light incident on the touch surface. The optical system 350 can further include an optical sensor 145 disposed to receive light transmitted through the optical element 300 along the first primary direction 131. In some embodiments, the optical sensor 145 is an infrared light sensor. In some embodiments, the first and second primary directions are different (e.g., the first primary direction can be direction 131 and the second primary direction can be direction 132). In some embodiments, the first and second primary directions are the same (e.g., the first and second primary directions can each be direction 131).

FIGS. 10A-10B are schematic views of maximum projected areas of the optical element 300 and the refractive component 160 according to some embodiments. As schematically illustrated in FIG. 10A, in some embodiments, the optical element 300 is substantially coextensive with at least a portion of the refractive component 160, where the portion of the refractive component 160 has a maximum projected area of at least about 30% of a maximum projected area of the refractive component 160. As schematically illustrated in FIG. 10B, in some embodiments, the optical element 300 and the refractive component 160 are substantially coextensive. A layer or surface can be substantially coextensive with another layer or surface when at least 60% or at least 70% or at least 80% or at least 90% of a total area of the layer or surface is coextensive with at least 60% or at least 70% or at least 80% or at least 90%, respectively, of a total area of the other layer or surface.

The number of primary directions can be determined by the number and shape of light redirecting films, for example, included in the refractive component 160. For example, at least one first light beam (e.g., a substantially normally incident light beam having a diameter larger than a prism width) incident on a single prism film will result in two primary directions, while the first light beam incident on crossed prism films will result in four primary directions. FIG. 11 is a schematic cross-sectional view of a truncated prism film 352 which includes a plurality of truncated prisms 354 arranged along a first direction (x-direction) and extending along an orthogonal second direction (y-direction). At least one first light beam incident on the film 352 will be split into 3 beam segments, one for each facet of the truncated prisms 354. More generally, n non-vertical facets can result in n beam segments. Two crossed truncated prism films 352 will result in 9 primary directions. In some embodiments, the 2 to 9 primary directions are 2, 4, or 9 primary directions. In some embodiments, the 2 to 9 primary directions are 4 primary directions.

FIGS. 12A-12C are conoscopic plots illustrating beam segments 665 and primary directions 667. Each point in a conoscopic plot represents a direction (specified by an azimuthal angle and a polar angle). The darker regions indicate higher intensity of transmitted light. The beam segment 665 are higher intensity regions representing light beams propagating primarily along primary directions 667 which can be taken to be the directions where the intensity has a local maximum. In FIG. 12A, there are two beam segments 665 propagating in two primary directions 667; in FIG. 12B, there are four beam segments 665 propagating in four primary directions 667; and in FIG. 12C, there are nine beam segments 665 propagating in nine primary directions 667.

In some embodiments, the microlens layer is boned to a display panel through a low index layer. In some embodiments, the low index layer has a refractive index of no more than 1.3 (e.g., in a range of 1.1 to 1.3) and is disposed on and has a major surface substantially conforming to the first major surface 103 of the lens layer 110. Refractive index refers to the refractive index at 633 nm unless indicated otherwise. Layers having a refractive index of no more than 1.3 may be nanovoided layers as described in U.S. Pat. Appl. Publ. Nos. 2013/0011608 (Wolk et al.) and 2013/0235614 (Wolk et al.), for example.

In some embodiments, optical decoupling structures (also referred to as elongated spacer elements) are provided on the first major surface 103 so that the optical decoupling structures can be bonded to an adjacent display panel with an adhesive layer, for example, while creating an airgap between the microlenses and the adhesive layer.

Figure 13A:
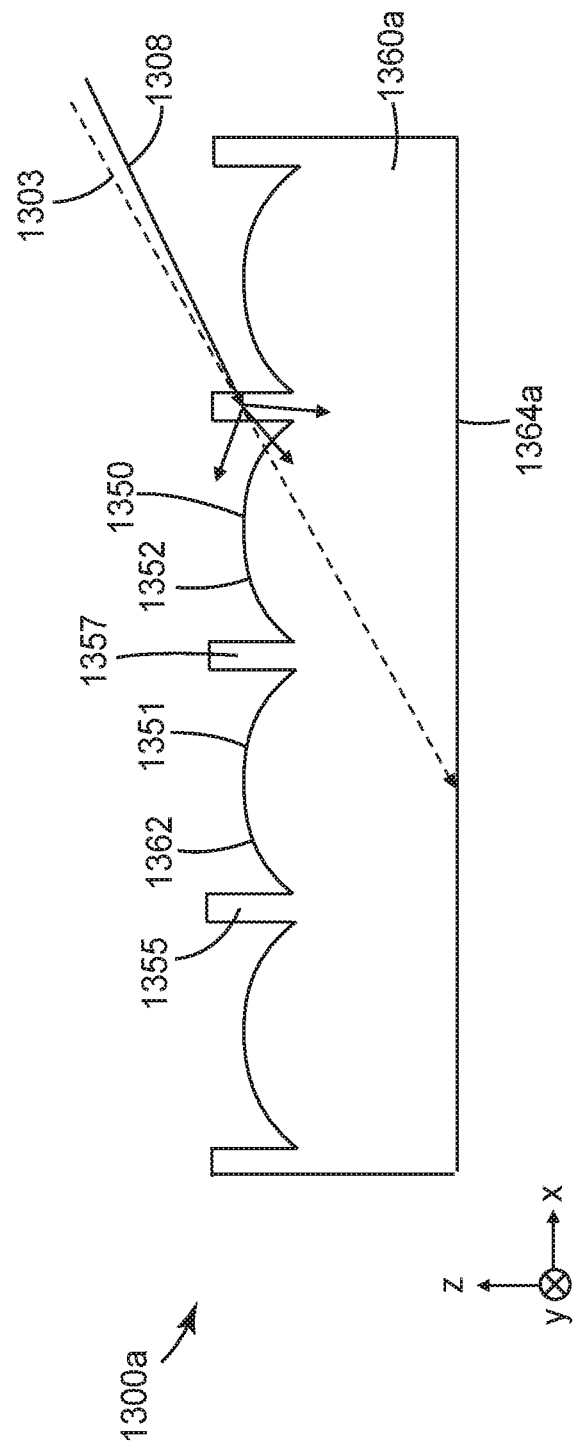
FIG. 13A is a schematic cross-sectional view of an optical element or layer including microlenses and optical decoupling structures.

FIG. 13A is a schematic cross-sectional view of an optical element 1300a (e.g., corresponding to 100, 200, or 300) including a layer 1360a having opposing first and second major surfaces 1362 and 1364a. The first major surface 1362 includes an array of microlenses 1350 and an array of optical decoupling structures 1355 which extend from the layer 1360a to above the tops of the microlenses 1350. The optical decoupling structures 1355 may be posts, for example. Each microlens in the array of microlenses 1350 is concave toward the second major surface 1364a. Each optical decoupling structure 1357 in at least a majority of optical decoupling structures in the array of optical decoupling structures 1355 is positioned between two or more adjacent microlenses 1351 and 1352 in the array of microlenses 1350 and extends above the two or more adjacent microlenses 1351 and 1352 in a direction (e.g., z-direction, referring to the x-y-z coordinate system depicted in FIG. 13A) away from the second major surface 1364a. For example, all optical decoupling structures in the array of optical decoupling structures 1355 may be positioned between two or more adjacent microlenses in the array of microlenses 1350, or all optical decoupling structures except for optical decoupling structures near corners or edges of the array of microlenses 1350 may be positioned between two or more adjacent microlenses.

In some embodiments, the layer 1360a is a monolithic layer (e.g., formed along with the microlenses 1350 in, for example, a cast and cure process). In other embodiments, the optical decoupling structures 1355 are printed onto a microlens layer so that the layer of optical decoupling structures and the microlenses layer are sublayers of the layer 1360a.

In some embodiments, the array of optical decoupling structures 1355 is adapted to substantially diverge, diffuse, reflect, or absorb light obliquely incident on the optical element 1300a. This can be achieved by adding diffusive particles to printed optical decoupling structures, for example, or by suitably selecting a shape (e.g., curvature of the sides) of the optical decoupling structures, or by applying a coating (e.g., a reflective coating) to the optical decoupling structures. This can provide reduced cross-talk between neighboring microlenses. For example, an obliquely incident light ray 1303 could be transmitted through an optical decoupling structures and through a first microlens to an opening in a mask layer (see, e.g., FIG. 13B) aligned with an adjacent microlens. If the optical decoupling structures substantially diverges, diffuses, reflects, or absorbs the obliquely incident light, it can substantially reduce this cross-talk. This is schematically illustrated for light ray 1308 which is diffused by an optical decoupling structures in the array of optical decoupling structures 1355 thereby reducing potential cross-talk.

The optical decoupling structures can be any objects which protrude beyond the microlenses for attachment to an adjacent layer such that the adjacent layer does not contact the microlenses. The optical decoupling structures can be cylindrical posts or can be posts having a non-circular cross-section (e.g., rectangular, square, elliptical, or triangular cross-section). The optical decoupling structures can have a constant cross-section, or the cross-section can vary in the thickness direction (e.g., the optical decoupling structures can be posts which are tapered to be thinner near the top of the posts). In some embodiments, the optical decoupling structures have a tapered elliptical cross-section. For example, the optical decoupling structures can have any of the geometries of the optical decoupling structures described in International Appl. Pub. No. WO 2019/135190 (Pham et al.). In some embodiments, the optical decoupling structures extend from a base of the array of microlenses. In some embodiments, at least some optical decoupling structures are disposed on top of at least some of the microlenses.

Figure 13B:
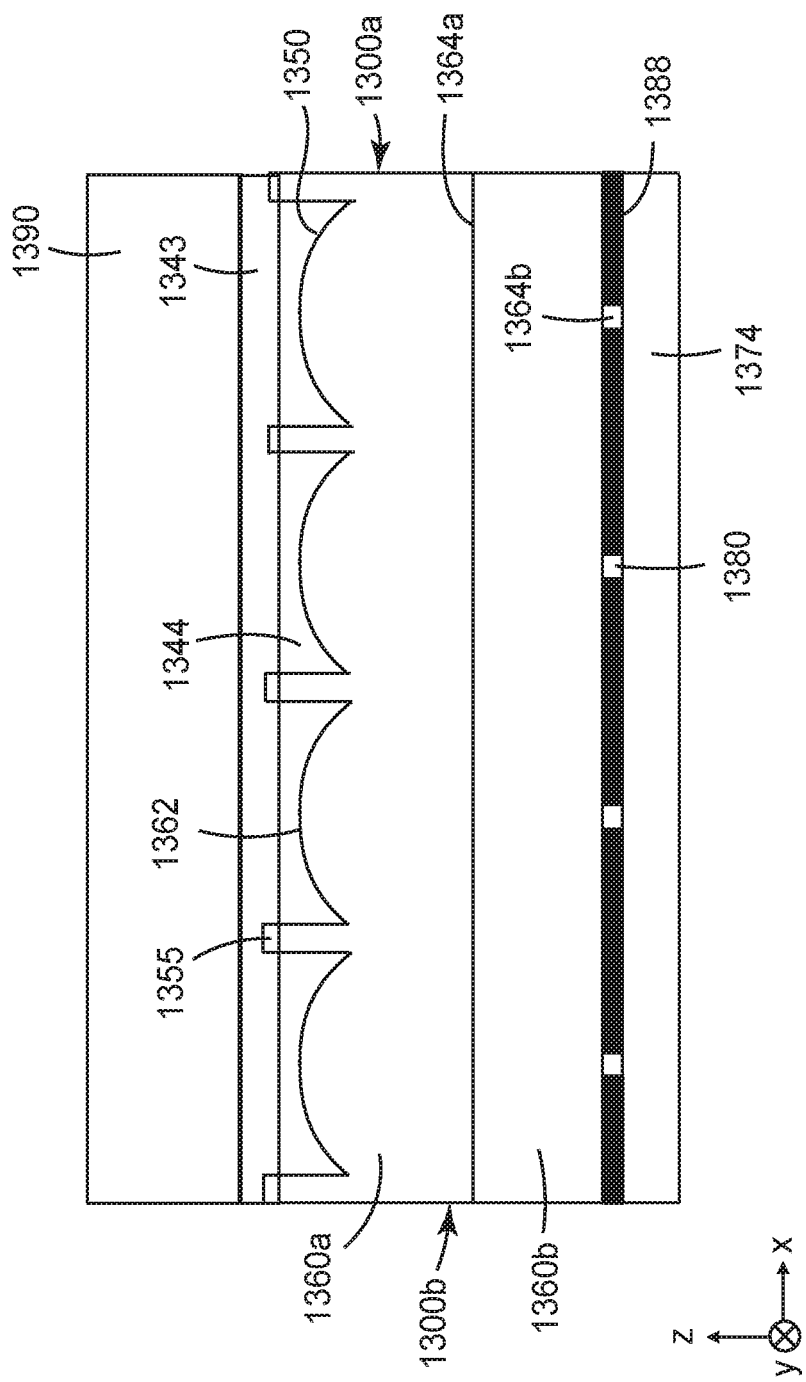
FIG. 13B is a schematic cross-sectional view of the optical element or layer of FIG. 13A attached to an adjacent layer.

FIG. 13B is a schematic cross-sectional view of an optical element 1300*b* which includes optical element 1300*a* and further includes a layer 1360*b*. The layers 1360*a* and 1360*b* together define a first layer having a first major surface 1362 and an opposing second major surface 1364*b*. Optical element 1300*b* further includes a mask layer 1388 disposed on the second major surface 1364*b*. The mask layer 1388 is also disposed indirectly on the second major surface 1364*a*. An additional layer 1374 is disposed on the mask layer 1388. An optional second mask layer can be disposed on the additional layer 1374 opposite the mask layer 1388, if desired.

The mask layer 1388 includes an array of through openings 1380 as described further elsewhere herein. Optical element 1300*b* further includes an adhesive layer 1343 adjacent the first major surface 1362. Each optical decoupling structure 1355 at least partially penetrates the adhesive layer 1343 and each microlens 1350 is entirely separated from the adhesive layer 1343 by an airgap 1344. The adhesive layer 1343 is attached to a display 1390 in the illustrated embodiment.

Figure 14:
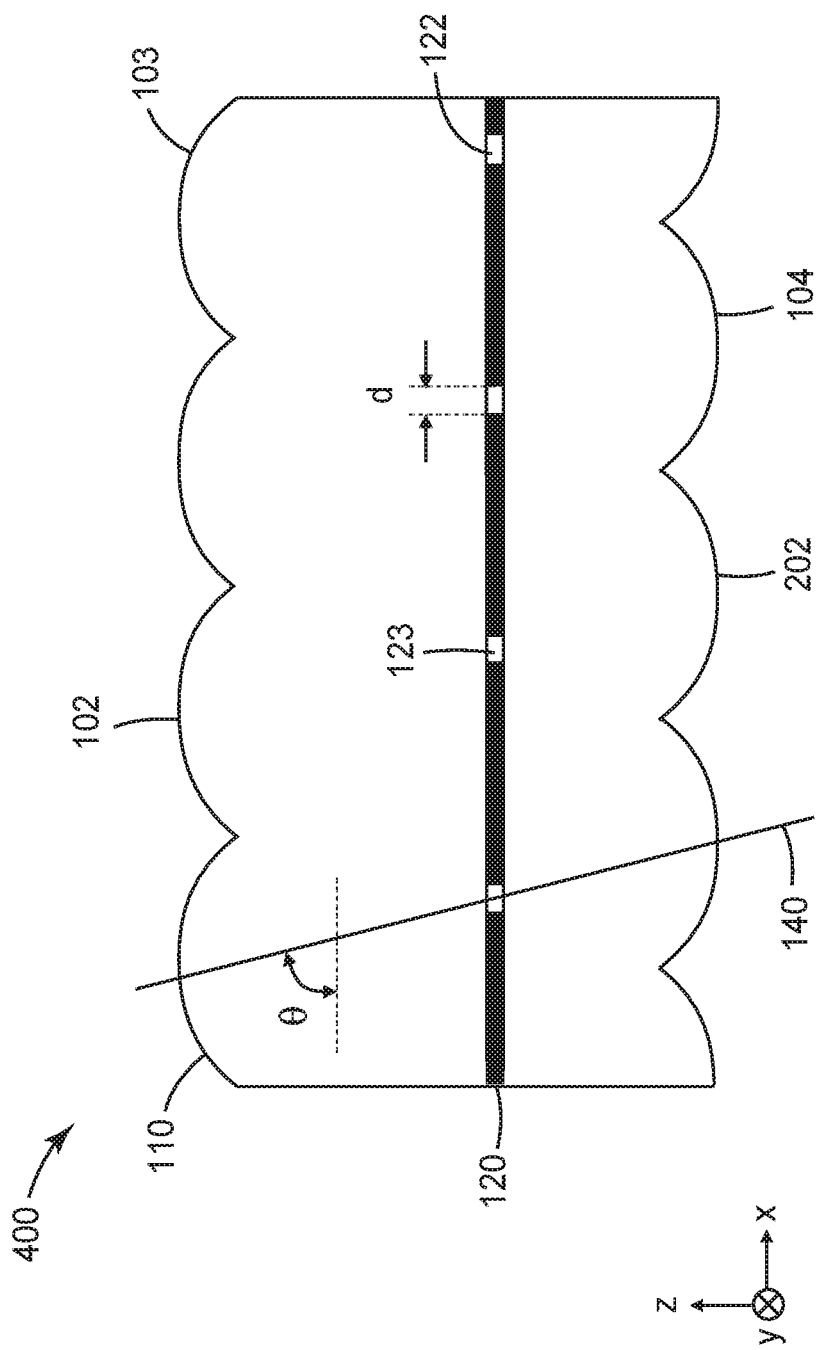
FIG. 14 is a schematic cross-sectional view of an optical element or layer including two pluralities of microlenses.

In some embodiments, an optical element or layer includes two pluralities of microlenses. FIG. 14 is a schematic cross-sectional view of an optical element or layer 400 (e.g., corresponding to 100, 200, or 300) having opposite first and second major surfaces 103 and 104 where the first major surface 103 includes a first plurality of microlenses 102 and the second major surface 104 includes a second plurality of microlenses 202. The optical element or layer 400 includes an embedded optically opaque first mask layer 120 disposed between and spaced apart from the first and second major surfaces 103 and 104. The first mask layer 120 defines a plurality of through first openings 122 therein. The microlenses 102 and 202 can be formed on opposite sides of a mask layer 120 (e.g., embedded between polymeric layers) using a cast and cure process, for example, where the microlenses 102 and 202 are aligned and where the first openings 122 can be formed in the mask layer 120 after the microlenses 102 and 202 are formed.

In some embodiments, there is a one-to-one correspondence between the microlenses 102 and the first openings 122. In some embodiments, the microlenses 102 and corresponding first openings 122 are substantially centered on straight lines 140 making a same oblique angle θ with a first lens layer 110 or with the first mask layer 120. In some embodiments, there is a one-to-one correspondence between at least a majority of the microlenses 102 and at least a majority of the microlenses 202. In some embodiments, the is a one-to-one correspondence between the microlenses 102 and the microlenses 202. In some embodiments, the microlenses 102 and corresponding first openings 122 and corresponding microlenses 202 are substantially centered on the straight lines 140. In some embodiments, for each first opening in at least a majority of the first openings 122, the first opening defines a voided region 123. The voided regions can have a maximum thickness greater than an average thickness of the first mask layer 120 as described further elsewhere. The microlenses 102 can be used to focus light on the openings 122 and the microlenses 202 can be used to collimate the light transmitted through the openings 122, for example. In some embodiments, the optical element or layer 400 includes two spaced apart mask layers (see, e.g., FIG. 1) disposed between the first and second major surfaces 103 and 104.

EXAMPLES

Examples 1-2 and Comparative Example C1

Optical modeling using LightTools ray tracing software (available from Synopsis, Inc., Mountain View, CA) was carried out as follows. A Lambertian point source was used to represent a fingerprint. In the model, crossed prism films were placed between the point source and an image sensor, an LCD display panel was placed between the point source and the crossed prism films, and an optical element similar to optical element or layer 100 or 200 was placed between the crossed prism films and the image sensor with the microlenses facing the crossed prism films and the mask layer(s) facing the image sensor. The through openings were positioned such that light incident on the microlenses at 52 degrees relative to a normal to the plane of the optical element would pass through the optical element. Model parameters were as follows: the LCD panel thickness was 0.5 mm; the distance from the point source to the optical element was 1 mm; the radius of curvature of the microlenses was 25 micrometers; the distance from the top of microlens layer to the first mask layer was 32 micrometers; when two mask layers was included, the spacing between the two mask layers was 5 micrometers; the through opening diameter was 3 micrometers; the refractive index of the microlenses was 1.65; and the material of the mask layers was modeled as a perfect optical absorber.

Figure 15:
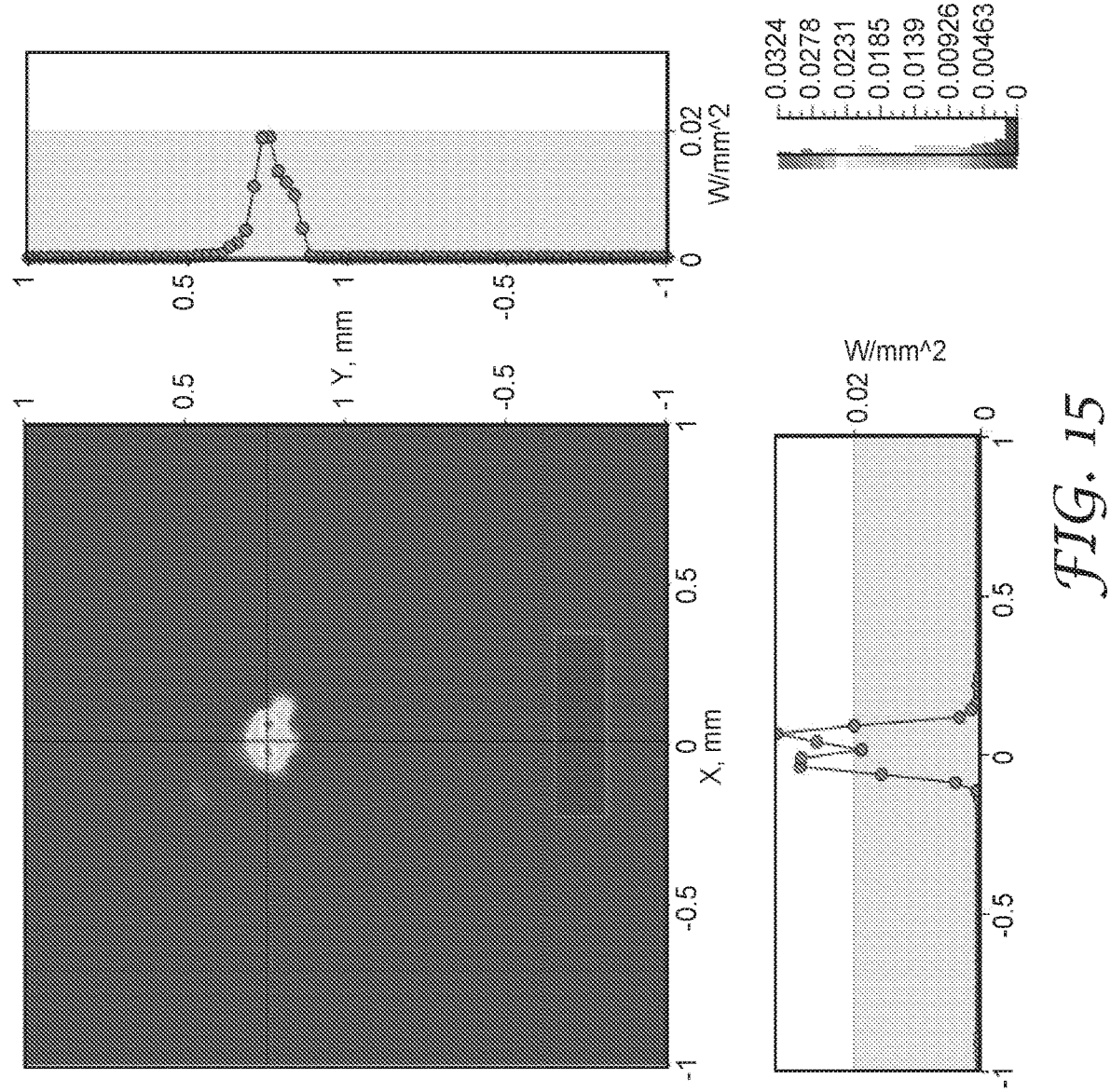
FIGS. 15-17 are plots of calculated point spread functions of optical systems.
Figure 16:
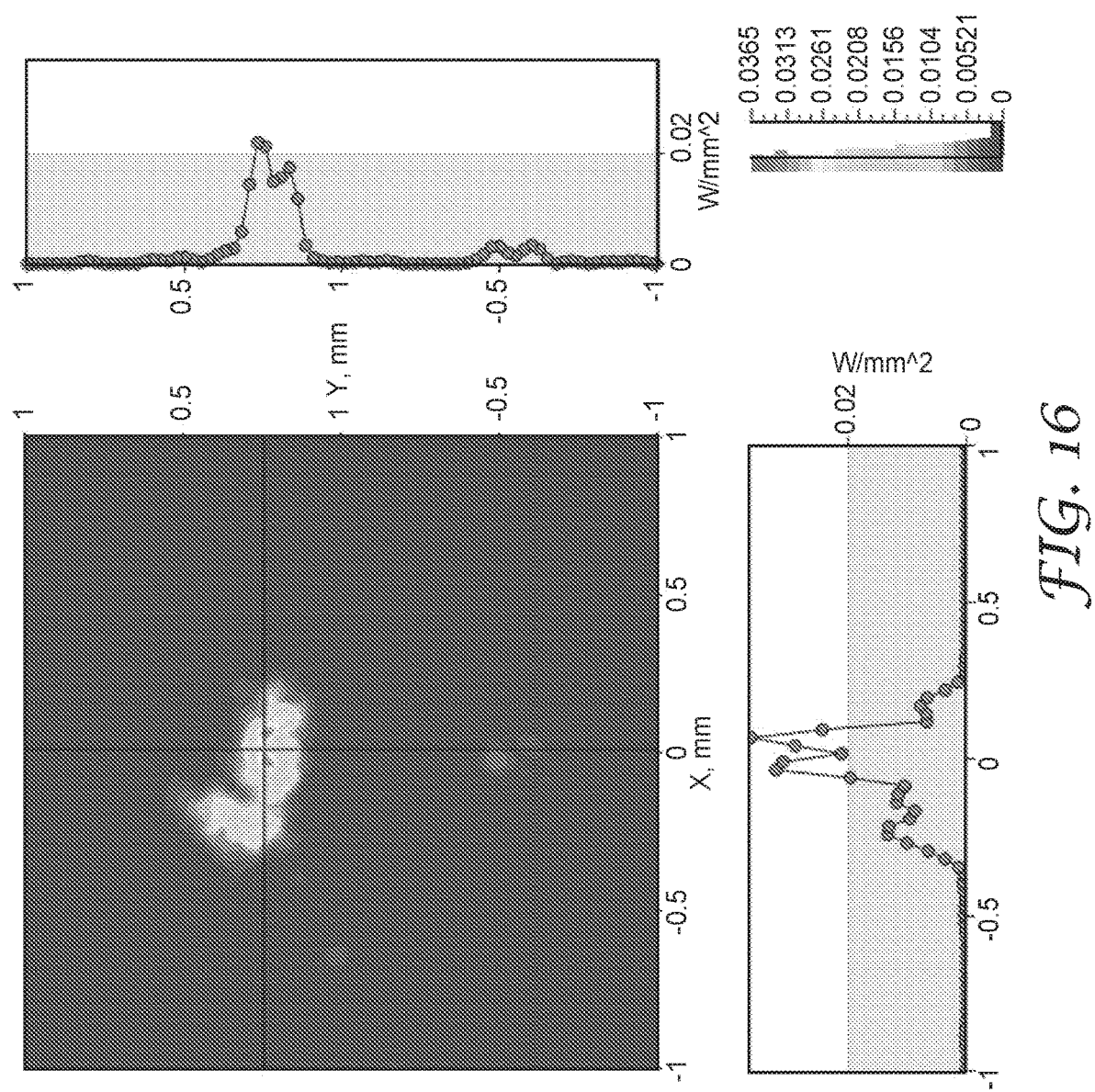
Figure 17:
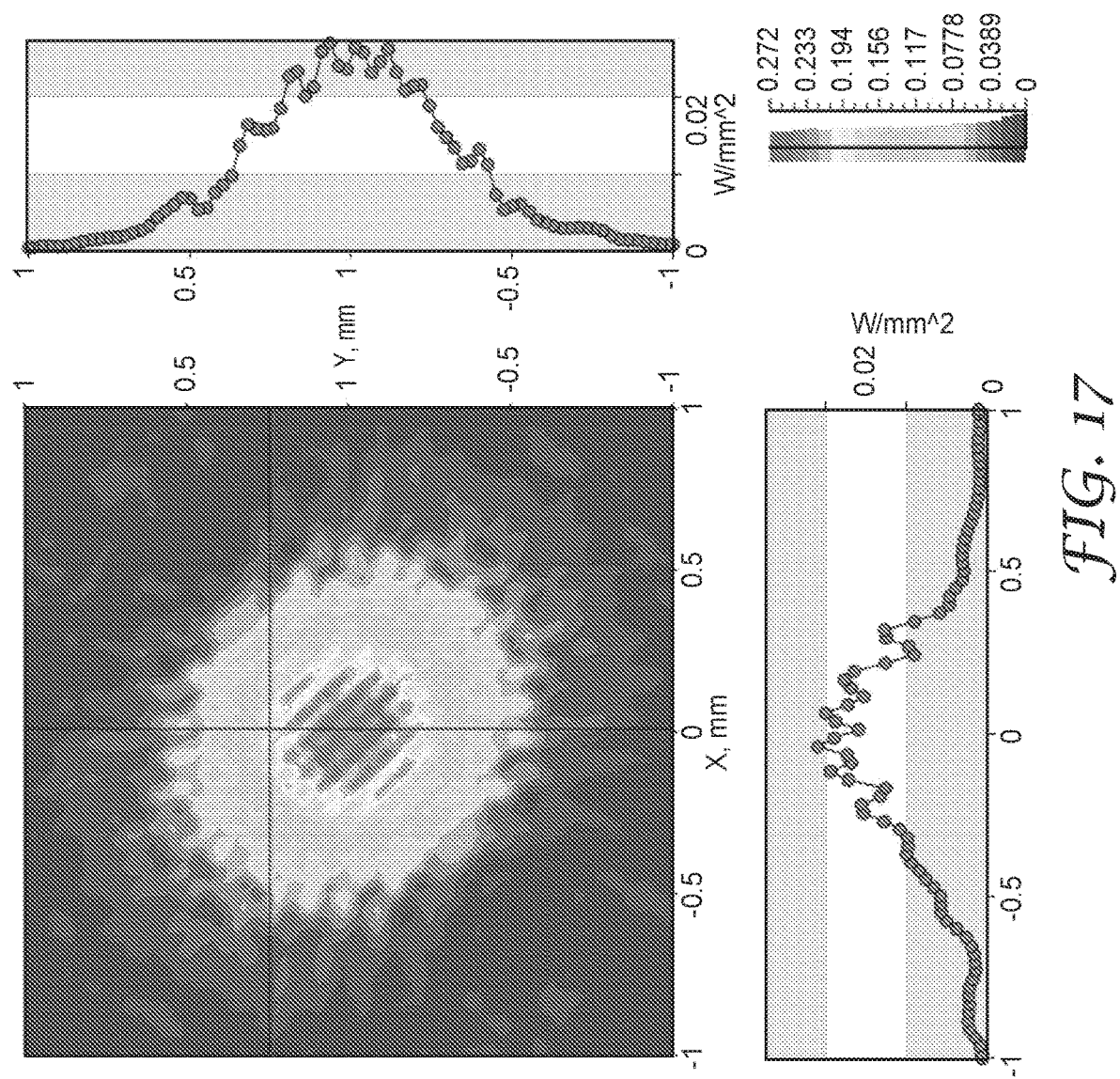

FIGS. 15-17 show the point spread function determined for the case where the optical element included two mask layers (Example 1), for the case where the optical element included only one mask layer (Example 2), and for the case where the optical element was omitted (Comparative Example C1), respectively. The width of the point spread function was significantly reduced when an optical element was included compared to the case where the optical element was omitted. Including two mask layers significantly reduced the point spread function compared to the case where a single mask layer was used.

Example 3

An optical element similar to optical element 100 was prepared as follows. A microlens layer was formed on a 0.92 mil thick PET substrate using a cast and cure process. The microlens layer was formed from an acrylic resin having a refractive index of about 1.69 at 532 nm. The microlenses had an average radius of curvature of about 17 micrometers and were disposed at a pitch of about 20 micrometers. A 30 nm thick aluminum layer was vacuum coated onto on the PET substrate on the side substrate opposite the microlens layer, a 4 micrometer thick polymer layer was coated onto the aluminum layer and cured, a second 30 nm thick aluminum layer was vacuum coated onto the polymer layer, and a 1 micrometer thick polymer layer was coated onto the second aluminum layer and cured. Through holes in the aluminum layers were then formed by laser ablation through the microlens layer. A 40 W SPI laser (available from SPI Lasers, Southampton, UK) was used at 50% power with a 7× expander installed, a 167 mm F-Theta lens, a 30 nm pulse length, a 20 kHz repetition rate, a 2 m/s scanning speed, and a 100 micrometer spacing.

Figure 18:
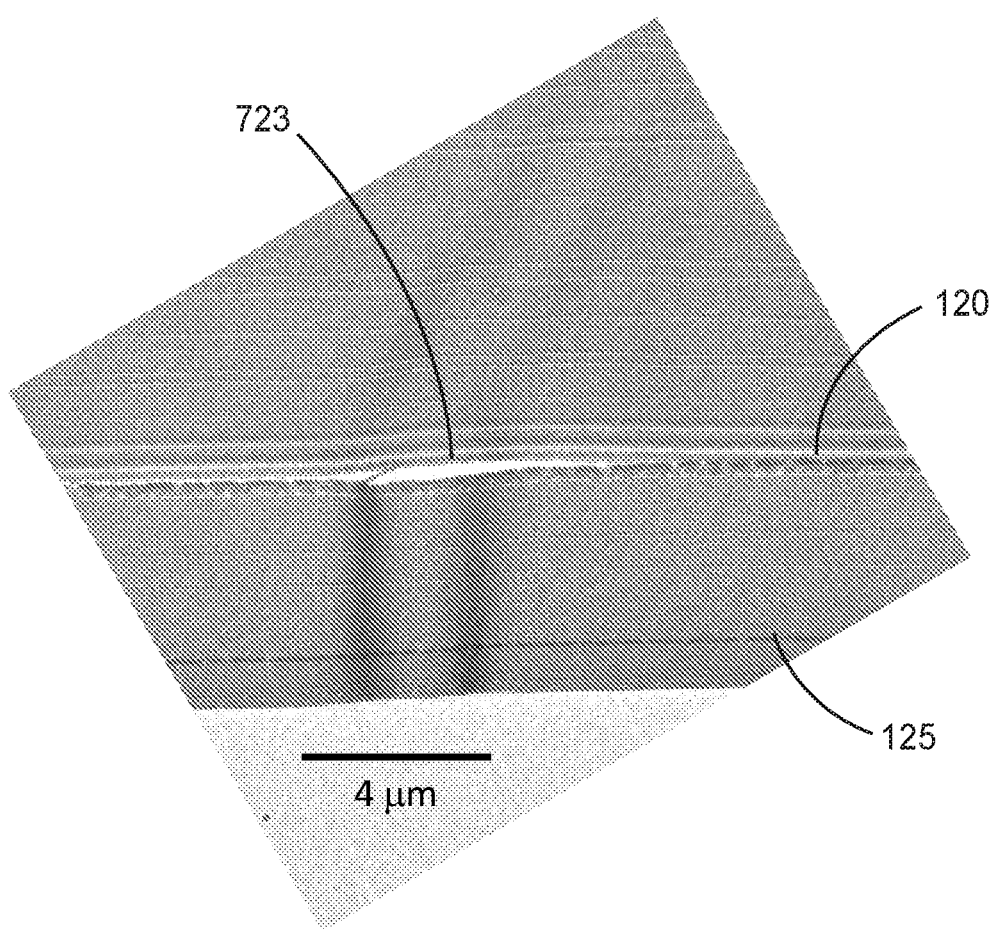
FIGS. 18-20 are images of sections through openings in embedded mask layers.
Figure 19:
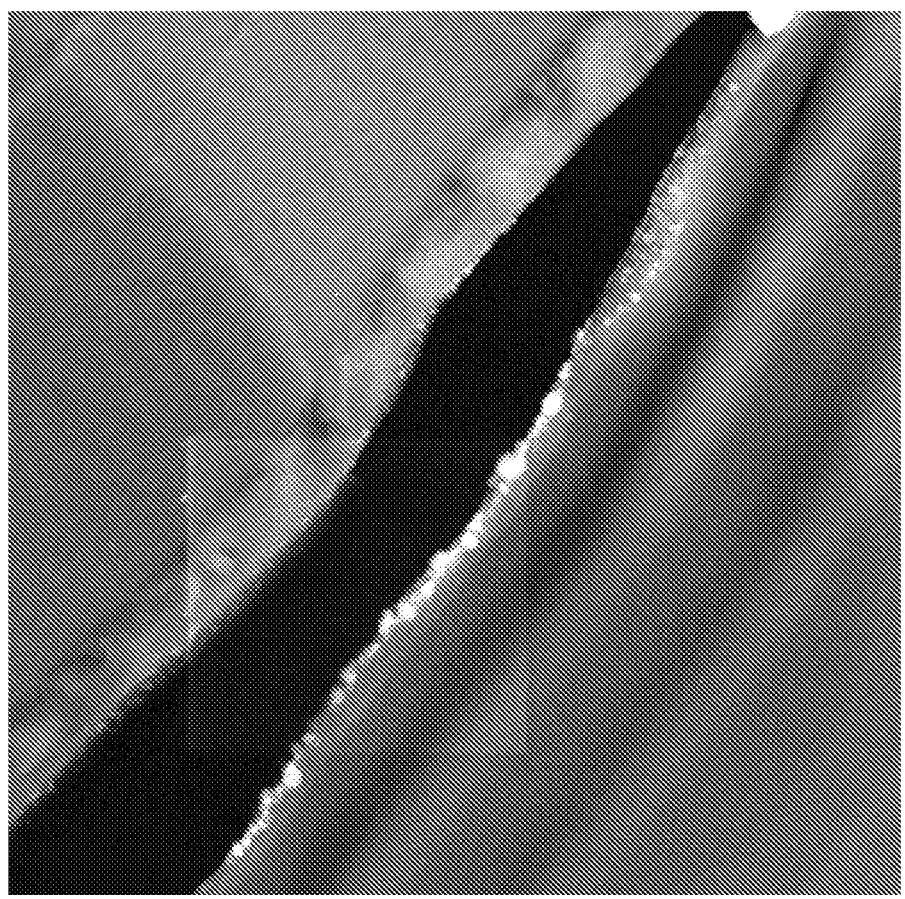
Figure 20:
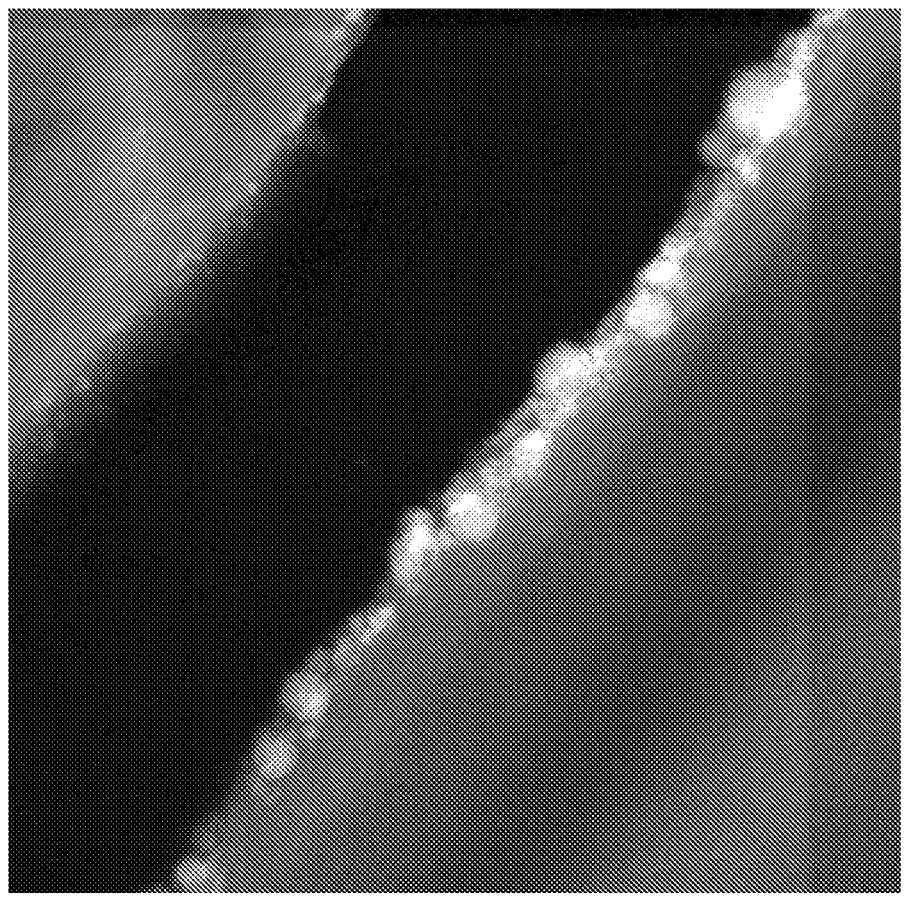

Approximately 120 nm thick sections of the resulting optical layer were microtomed from the sample. FIG. 18 is a transmission electron microscope (TEM) image of a section through an opening in the first mask layer 120, which was an embedded layer of the optical element 100. A voided region 723 or gas pocket resulting from the ablation process is visible in the image. Cracks in the mask layers 120 and 125 resulting from the microtoming process are visible. Voided regions were formed in the mask layer 125 that were outside the region shown in the figure. The voided region 723 had a maximum thickness greater than the thickness of the first mask layer. FIG. 19 is a High-Angle Annular Dark-Field (HAADF) image of a section through an opening in the first mask layer 120. FIG. 20 is a higher magnification image of a portion of FIG. 19. Nanoparticles are visible at opposing surfaces of the voided region. STEM-EDS (Scanning Transmission Electron Microscope-Energy-Dispersive Spectroscopy) analysis indicated that the nanoparticles were composed mostly of aluminum and oxygen.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical layer comprising:
a structured first major surface and an opposite second major surface, the structured first major surface comprising a plurality of microlenses arranged along orthogonal first and second directions; and
an embedded optically opaque first mask layer disposed between and spaced apart from the first and second major surfaces, the first mask layer defining a plurality of laser-ablated through first openings therein arranged along the first and second directions, there being a one-to-one correspondence between the microlenses and the first openings, wherein for each first opening in at least a majority of the first openings, the first opening defines a voided region having a top major surface facing the first major surface and an opposite bottom major surface facing the second major surface, wherein in a cross-section of the optical layer substantially perpendicular to optical layer, the optical layer comprises a plurality of nanoparticles concentrated along at least one of the top and bottom major surfaces of the voided regions, wherein the first mask layer comprises a first material and the nanoparticles comprise at least one of the first material or an oxide of the first material.

2. The optical layer of claim 1, wherein for each first opening in at least a majority of the first openings, the voided region has a maximum thickness greater than an average thickness of the first mask layer.

3. The optical layer of claim 1, wherein the average thickness of the first mask layer is t, the first openings have an average largest lateral dimension d, and t/d<0.05.

4. The optical layer of claim 1, wherein in a cross-section of the optical layer substantially perpendicular to optical layer, the top and bottom surfaces have a separation closer to a center of the voided region greater than a separation closer to an edge of the voided region.

5. The optical layer of claim 1, wherein at least one of the top and bottom major surfaces has a surface roughness in a range of 10 nm to 200 nm.

6. An optical system comprising:
the optical layer of claim 1; and
an optically opaque second mask layer spaced apart from the lens and first mask layers and defining a plurality of through second openings therein arranged along the first and second directions, the first mask layer disposed between the lens and the second mask layers, there being a one-to-one correspondence between the microlenses and the first and second openings, such that for each microlens, the microlens and corresponding first and second openings are substantially centered on a straight line making a same oblique angle with the lens layer, wherein when an image light carrying an image is incident on the microlens along the straight line, the image light substantially filling the microlens, greater than about 45% of the incident image light is transmitted by the second opening, and at least one of the first and second openings is sized so as to reduce an image quality degradation due to the microlens.

7. The optical system of claim 6 further comprising:
a liquid crystal display extending along the first and second directions;
a lightguide disposed to illuminate the liquid crystal display;
a refractive component disposed between the liquid crystal display and the lightguide, the refractive component comprising a first prism film comprising a first plurality of prisms extending along a first longitudinal direction substantially parallel to the lens layer; and
an optical sensor disposed proximate the lightguide opposite the liquid crystal display,
wherein an optical element comprising the lens layer and the first and second mask layers is disposed between the lightguide and the optical sensor such that the second mask layer faces the optical sensor.

8. An optical system comprising:
a refractive component extending along orthogonal first and second directions such that for at least one first light beam incident on the refractive component along a third direction substantially orthogonal to the first and second directions, the refractive component splits the first light beam into 2 to 9 beam segments exiting the refractive component along respective 2 to 9 primary directions, the 2 to 9 primary directions comprising a first primary direction;
an optical element disposed proximate the refractive component such that at least 45% of light in the beam segment that is incident on the optical element along the first primary direction, but not any other primary direction, is transmitted through the optical element, wherein the optical element comprises the optical layer of claim 1;
a light source disposed to emit light along a direction substantially parallel to a second primary direction in the 2 to 9 primary directions; and
an optical sensor disposed to receive light transmitted through the optical element along the first primary direction.

9. An optical layer comprising:
a structured first major surface and an opposite second major surface, the structured first major surface comprising a plurality of microlenses arranged along orthogonal first and second directions; and
an embedded optically opaque first mask layer disposed between and spaced apart from the first and second major surfaces, the first mask layer defining a plurality of laser-ablated through first openings therein arranged along the first and second directions, there being a one-to-one correspondence between the microlenses and the first openings, wherein for each first opening in at least a majority of the first openings, the first opening defines a voided region having a maximum thickness greater than an average thickness of the first mask layer, wherein the average thickness of the first mask layer is t, the first openings have an average largest lateral dimension d, and $t/d<0.05$.

10. The optical layer of claim 9, wherein for each first opening in at least a majority of the first openings, the voided region has a top major surface facing the first major surface and an opposite bottom major surface facing the second major surface.

11. The optical layer of claim 9, wherein in a cross-section of the optical layer substantially perpendicular to optical layer, the optical layer comprises a plurality of nanoparticles concentrated along each of the top and bottom major surfaces of the voided regions.

12. The optical layer of claim 9 further comprising an optically opaque second mask layer spaced apart from the lens and first mask layers and defining a plurality of through second openings therein arranged along the first and second directions, the first mask layer disposed between the lens and the second mask layers, there being a one-to-one correspondence between the microlenses and the first and second openings, such that for each microlens, the microlens and corresponding first and second openings are substantially centered on a straight line making a same oblique angle with the lens layer.

13. An optical system comprising:
a refractive component extending along orthogonal first and second directions such that for at least one first light beam incident on the refractive component along a third direction substantially orthogonal to the first and second directions, the refractive component splits the first light beam into 2 to 9 beam segments exiting the refractive component along respective 2 to 9 primary directions, the 2 to 9 primary directions comprising a first primary direction;
an optical element disposed proximate the refractive component such that at least 45% of light in the beam segment that is incident on the optical element along the first primary direction, but not any other primary direction, is transmitted through the optical element, wherein the optical element comprises the optical layer of claim 9;
a light source disposed to emit light along a direction substantially parallel to a second primary direction in the 2 to 9 primary directions; and
an optical sensor disposed to receive light transmitted through the optical element along the first primary direction.

14. An optical layer comprising:
a structured first major surface and an opposite second major surface, the structured first major surface comprising a plurality of microlenses arranged along orthogonal first and second directions; and
an embedded optically opaque first mask layer disposed between and spaced apart from the first and second major surfaces, the first mask layer defining a plurality of laser-ablated through first openings therein arranged along the first and second directions, there being a one-to-one correspondence between the microlenses and the first openings, wherein for each first opening in at least a majority of the first openings, the first opening defines a voided region having a top major surface facing the first major surface and an opposite bottom major surface facing the second major surface, wherein in a cross-section of the optical layer substantially perpendicular to optical layer, the top and bottom surfaces have a separation closer to a center of the voided region greater than a separation closer to an edge of the voided region, and at least one of the top and bottom major surfaces has a surface roughness in a range of 10 nm to 200 nm.

15. The optical layer of claim 14, wherein in a cross-section of the optical layer substantially perpendicular to optical layer, the optical layer comprises a plurality of nanoparticles concentrated along each of the top and bottom major surfaces of the voided regions.

16. The optical layer of claim 14 further comprising an optically opaque second mask layer spaced apart from the lens and first mask layers and defining a plurality of through second openings therein arranged along the first and second directions, the first mask layer disposed between the lens and the second mask layers, there being a one-to-one correspondence between the microlenses and the first and second openings, such that for each microlens, the microlens and corresponding first and second openings are substantially centered on a straight line making a same oblique angle with the lens layer.

17. An optical system comprising:
- a refractive component extending along orthogonal first and second directions such that for at least one first light beam incident on the refractive component along a third direction substantially orthogonal to the first and second directions, the refractive component splits the first light beam into 2 to 9 beam segments exiting the refractive component along respective 2 to 9 primary directions, the 2 to 9 primary directions comprising a first primary direction;
- an optical element disposed proximate the refractive component such that at least 45% of light in the beam segment that is incident on the optical element along the first primary direction, but not any other primary direction, is transmitted through the optical element, wherein the optical element comprises the optical layer of claim 14;
- a light source disposed to emit light along a direction substantially parallel to a second primary direction in the 2 to 9 primary directions; and
- an optical sensor disposed to receive light transmitted through the optical element along the first primary direction.

\* \* \* \* \*

UNITED STATES PATENT AND TRADEMARK OFFICE
CERTIFICATE OF CORRECTION

PATENT NO. : 12,222,599 B2
APPLICATION NO. : 17/776941
DATED : February 11, 2025
INVENTOR(S) : Zhaohui Yang Page 1 of 1

It is certified that error appears in the above-identified patent and that said Letters Patent is hereby corrected as shown below:

On the Title Page

Column 1, Item (72):
Line 8, Delete "Mercer Island, WA" and insert -- Woodbury, MN --, therefore.

Signed and Sealed this
Twenty-first Day of October, 2025

John A. Squires
*Director of the United States Patent and Trademark Office*